United States Patent
Chen et al.

(10) Patent No.: US 10,523,934 B2
(45) Date of Patent: Dec. 31, 2019

(54) SPLIT BASED MOTION VECTOR OPERATION REDUCTION

(71) Applicant: MediaTek Inc., Hsinchu (TW)

(72) Inventors: Chun-Chia Chen, Hsinchu (TW); Chih-Wei Hsu, Hsinchu (TW); Ching-Yeh Chen, Hsinchu (TW)

(73) Assignee: MediaTek Inc., Hsinchu (TW)

( * ) Notice: Subject to any disclaimer, the term of this patent is extended or adjusted under 35 U.S.C. 154(b) by 29 days.

(21) Appl. No.: 15/992,140

(22) Filed: May 29, 2018

(65) Prior Publication Data

US 2018/0352223 A1 Dec. 6, 2018

Related U.S. Application Data

(60) Provisional application No. 62/512,749, filed on May 31, 2017.

(51) Int. Cl.
| | |
|---|---|
| *H04N 19/105* | (2014.01) |
| *H04N 19/182* | (2014.01) |
| *H04N 19/513* | (2014.01) |
| *H04N 19/52* | (2014.01) |
| *H04N 19/70* | (2014.01) |

(52) U.S. Cl.
CPC ......... *H04N 19/105* (2014.11); *H04N 19/182* (2014.11); *H04N 19/513* (2014.11); *H04N 19/52* (2014.11); *H04N 19/70* (2014.11)

(58) Field of Classification Search
CPC ...... H04N 19/105; H04N 19/52; H04N 19/70; H04N 19/513; H04N 19/182
See application file for complete search history.

(56) References Cited

U.S. PATENT DOCUMENTS

| | | | | |
|---|---|---|---|---|
| 9,762,927 | B2 * | 9/2017 | Chen | H04N 19/597 |
| 2013/0077691 | A1 * | 3/2013 | Zheng | H04N 19/105 |
| | | | | 375/240.16 |
| 2014/0092981 | A1 * | 4/2014 | Lin | H04N 19/52 |
| | | | | 375/240.16 |
| 2014/0140408 | A1 * | 5/2014 | Lee | H04N 19/517 |
| | | | | 375/240.16 |
| 2014/0161186 | A1 * | 6/2014 | Zhang | H04N 19/597 |
| | | | | 375/240.16 |
| 2016/0044310 | A1 | 2/2016 | Park et al. | |
| 2016/0191939 | A1 | 6/2016 | Lin et al. | |
| 2017/0006302 | A1 | 1/2017 | Lee et al. | |
| 2018/0288430 | A1 * | 10/2018 | Chen | H04N 19/176 |
| 2018/0310017 | A1 * | 10/2018 | Chen | H04N 19/103 |

OTHER PUBLICATIONS

State Intellectual Property Office, International Search Report and Written Opinion for International Patent Application No. PCT/CN2018/089158, dated Aug. 29, 2018.

* cited by examiner

*Primary Examiner* — James M Pontius
(74) *Attorney, Agent, or Firm* — Han IP PLLC; Andy M. Han

(57) ABSTRACT

A reduced merge candidate signaling method is provided. When building a merge candidate list for a prediction unit (PU) of a block of pixels, a video codec skips or partially skips the construction of some sub-PU merge candidates. The video codec then performs simplified pruning operations on the merge candidate list based on the skipped or partially constructed sub-PU merge candidates. The pruned candidate list is then used to select a merge candidate to encode or decode the block of pixels.

20 Claims, 16 Drawing Sheets

| | T1 | T2 | T3 | T4 |
|---|---|---|---|---|
| L1 | A1,1 | A2,1 | A3,1 | A4,1 |
| L2 | A1,2 | A2,2 | A3,2 | A4,2 |
| L3 | A1,3 | A2,3 | A3,3 | A4,3 |
| L4 | A1,4 | A2,4 | A3,4 | A4,4 |

200

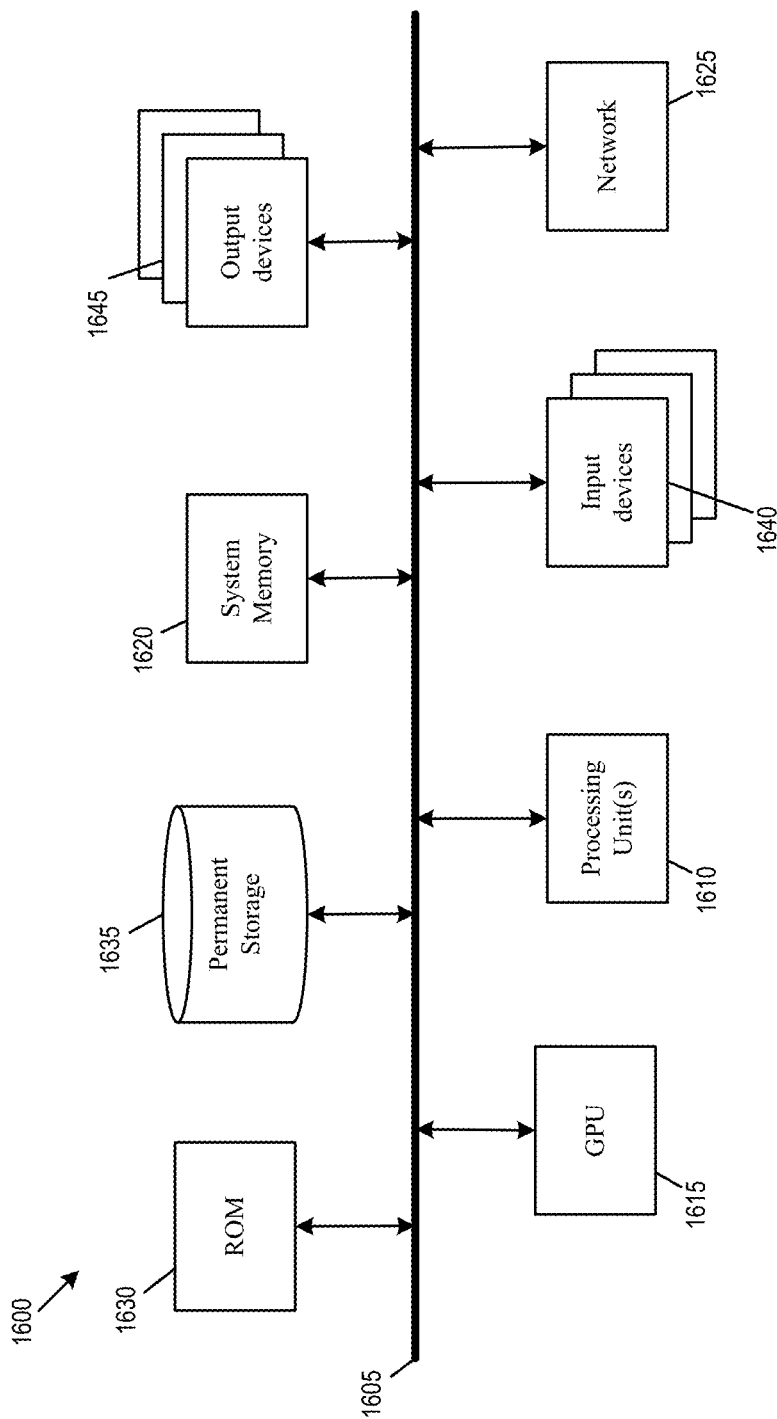

SPLIT BASED MOTION VECTOR OPERATION REDUCTION

CROSS REFERENCE TO RELATED PATENT APPLICATION(S)

The present disclosure is part of a non-provisional application that claims the priority benefit of U.S. Provisional Patent Application No. 62/512,749, filed on 31 May 2017. Contents of above-listed applications are herein incorporated by reference.

TECHNICAL FIELD

The present disclosure relates generally to video coding. In particular, the present disclosure relates to methods of generating merge candidate lists.

BACKGROUND

Unless otherwise indicated herein, approaches described in this section are not prior art to the claims listed below and are not admitted as prior art by inclusion in this section.

To increase the coding efficiency of motion vector (MV) coding, High Efficiency Video Coding (HEVC) provides Skip and Merge modes. Skip and Merge modes obtain motion information (MI) from spatially neighboring blocks (spatial candidates) or a temporal co-located block (temporal candidate). When a Prediction Unit (PU) is coded by Skip or Merge mode, no motion information is coded, instead, only the index of the selected candidate is coded. For Skip mode, the residual signal is forced to be zero and not coded. In HEVC, if a particular block is encoded by Skip or Merge mode, a candidate index is signaled to indicate which merge candidate among a set of candidates is used for merging. Each merged PU reuses the motion information of the selected merge candidate, which includes the MV, prediction direction, and references picture index of the selected merge candidate.

For merge mode in HM-4.0 of HEVC, up to four spatial merge candidates are derived from four spatial neighbors A0, A1, B0 and B1, and one temporal merge candidate is derived from TBR or TCTR (TBR is used first, if TBR is not available, TCTR is used instead). If any of the four spatial candidates is not available, the position B2 is then used to derive the temporal candidate as a replacement. After deriving the four spatial candidates and the one temporal candidate, redundant candidates are removed (pruned) from the merge candidate list. If after pruning, the number of available candidates in the merge candidate list is smaller than five, three types of additional candidates are derived and added to the candidate set (also referred to as merge candidate list). The encoder selects one final candidate within the candidate set for Skip, or Merge modes based on the rate-distortion optimization (RDO) decision and transmits the index to the decoder. (Hereafter in this document, skip mode and merge mode are collectively referred to as "merge mode").

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a reduced merge candidate signaling method. A video encoder implementing the method receives a block of pixels that comprises a PU. The video encoder generates, for the PU, a merge candidate list comprising one or more merge candidates. The video encoder partially constructs a sub-PU merge candidate by identifying or generating a first set of data for the sub-PU merge candidate and adds the partially constructed sub-PU merge candidate to the merge candidate list. The video encoder identifies a redundant merge candidate by comparing the first set of data for the partially constructed sub-PU merge candidate with a corresponding set of data for another merge candidate in the merge candidate list and removes the identified redundant merge candidate from the merge candidate list. The video encoder completes the sub-PU merge candidate by generating a second set of data based on the first set of data. The video encoder selects a merge candidate from the merge candidate list that includes the completed sub-PU merge candidate. The video encoder then encodes the block of pixels by using the selected merge candidate.

A video decoder implementing the method receives a block of pixels that comprises a PU. The video decoder generates, for the PU, a merge candidate list comprising one or more merge candidates. The video decoder partially constructs a sub-PU merge candidate by identifying or generating a first set of data for the sub-PU merge candidate and adds the partially constructed sub-PU merge candidate to the merge candidate list. The video decoder identifies a redundant merge candidate by comparing the first set of data for the partially constructed sub-PU merge candidate with a corresponding set of data for another merge candidate in the merge candidate list and removes the identified redundant merge candidate from the merge candidate list. The video decoder selects a merge candidate from the merge candidate list. When the selected merge candidate is the sub-PU merge candidate, the video decoder completes the sub-PU merge candidate by generating a second set of data based on the first set of data and decoding the block of pixels by using the completed sub-PU merge candidate.

In some embodiments, a video decoder implementing the method receives a block of pixels that include a PU. The video decoder generates a merge candidate list for the PU that includes one or more merge candidates that includes an incomplete sub-PU merge candidate. The video decoder selects a merge candidate from the merge candidate list. When the selected merge candidate is the sub-PU merge candidate, the video decoder completes the sub-PU merge candidate and decodes the block of pixels by using the completed sub-PU merge candidate.

BRIEF DESCRIPTION OF THE DRAWINGS

The accompanying drawings are included to provide a further understanding of the present disclosure and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

FIG. 16 conceptually illustrates an electronic system with which some embodiments of the present disclosure are implemented.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

Some embodiments of the disclosure provide a reduced merge candidate signaling method that allows a video codec to skip or to partially skip the generation (or construction) of some sub-PU merge candidates when building a merge candidate list for a block of pixels such as a coding unit (CU) or a prediction unit (PU). The video codec then performs simplified pruning operations on the merge candidate list based on the skipped or partially constructed sub-PU merge candidates. The pruned candidate list is then used to select a merge candidate to encode or decode the block of pixels. For a video codec that is a video encoder, the video codec may complete construction of the skipped or partially constructed sub-PU merge candidates before selecting the merge candidate. For a video codec that is a video decoder, the video codec may complete construction of a sub-PU merge candidate only if the selected merge candidate is the sub-PU merge candidate.

Figure 1:
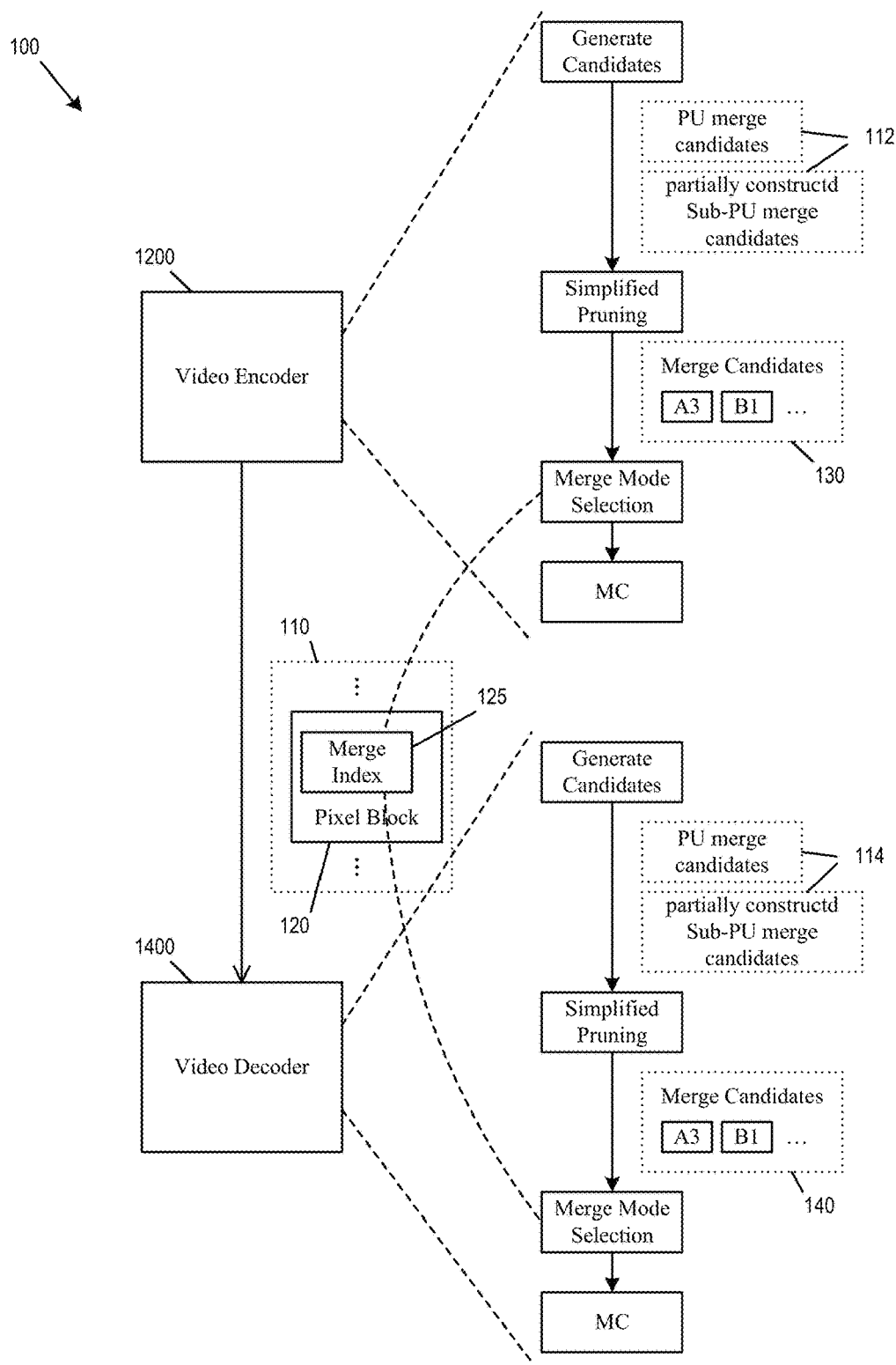
FIG. 1 illustrates a video system that skips or partially constructs sub-PU merge candidates when creating merge candidate lists for encoding and decoding blocks of pixels.

FIG. 1 illustrates a video system 100 that skips or partially constructs sub-PU merge candidates when creating merge candidate lists for encoding and decoding blocks of pixels. As illustrated, the video system 100 includes a video encoder 1200 that encodes video pictures into a bitstream 110 for delivery to a video decoder 1400 through various transmission methods or mediums. In the illustrated example, the bitstream 110 includes a block of pixels 120 that is encoded into the bitstream 110 by the video encoder 1200 and is to be decoded by the video decoder 1400. The block pixels 120 can coded as a coding unit (CU) or a prediction unit (PU).

To encode the block of pixels 120, the video encoder 1200 generates or identifies several merge candidates 112 The video encoder then creates a merge candidate list 130 from the identified merge candidates 112 and prunes off redundant candidates from the list 130. The video encoder then selects a merge candidate from the pruned merge candidate list 130 for performing motion compensation (MC) in order to encode the block of pixels 120. The selection is signaled in the bitstream as a merge index 125. The video encoder performs the reduced merge candidate signaling method, such that some of the merge candidates in the merge candidate list 130 are partially constructed and the video encoder performs simplified pruning based on the partially constructed merge candidates.

To decode the block pixels 120 from the bitstream 110, the video decoder 1400 generates a corresponding merge candidate list 140 by generating or identifying merge candidates 114 and then prune off redundant candidates. The video decoder then uses the merge index 125 to select a merge candidate from the pruned merge candidate list 140 for performing motion compensation (MC) in order to decode the block of pixels 120. The video decoder performs the reduced merge candidate signaling method, such that some of the merge candidates in the merge candidate list 140 are partially constructed and the video decoder performs simplified pruning based on the partially constructed merge candidates.

The video encoder 1200 and the video decoder 1400 perform identical algorithms and operations based on identical source data (previously decoded frames and neighboring blocks), the merge candidate list 140 is therefore expected to be identical to the merge candidate list 130. In some embodiments, the video system 100 may include the video encoder 1200 without including the video decoder 1400. In some other embodiments, the video system 100 may include the video decoder 1400 without including the video encoder 1200, which should not be limited in this disclosure.

When generating or identifying merge candidates, a video codec (the video encoder 1200 or the video decoder 1400) may identify one or more sub-PU merge candidates as well as one or more "normal" or non-sub-PU merge candidates. A sub-PU merge candidate has multiple sets of motion information for multiple sub-PUs. A non-sub-PU merge candidate (or "normal" merge candidate) includes one set of motion information for the whole PU. Unlike traditional temporal candidates, a sub-PU merge candidate corresponds to the current PU being partitioned into many sub-PUs and includes all corresponding temporal collocated motion vectors being found for each sub-PU. The current PU of size M×N has (M/P)×(N/Q) sub-PUs, each sub-PU is of size P×Q, where, in some embodiments, M is divisible by P, and N is divisible by Q.

Figure 2:
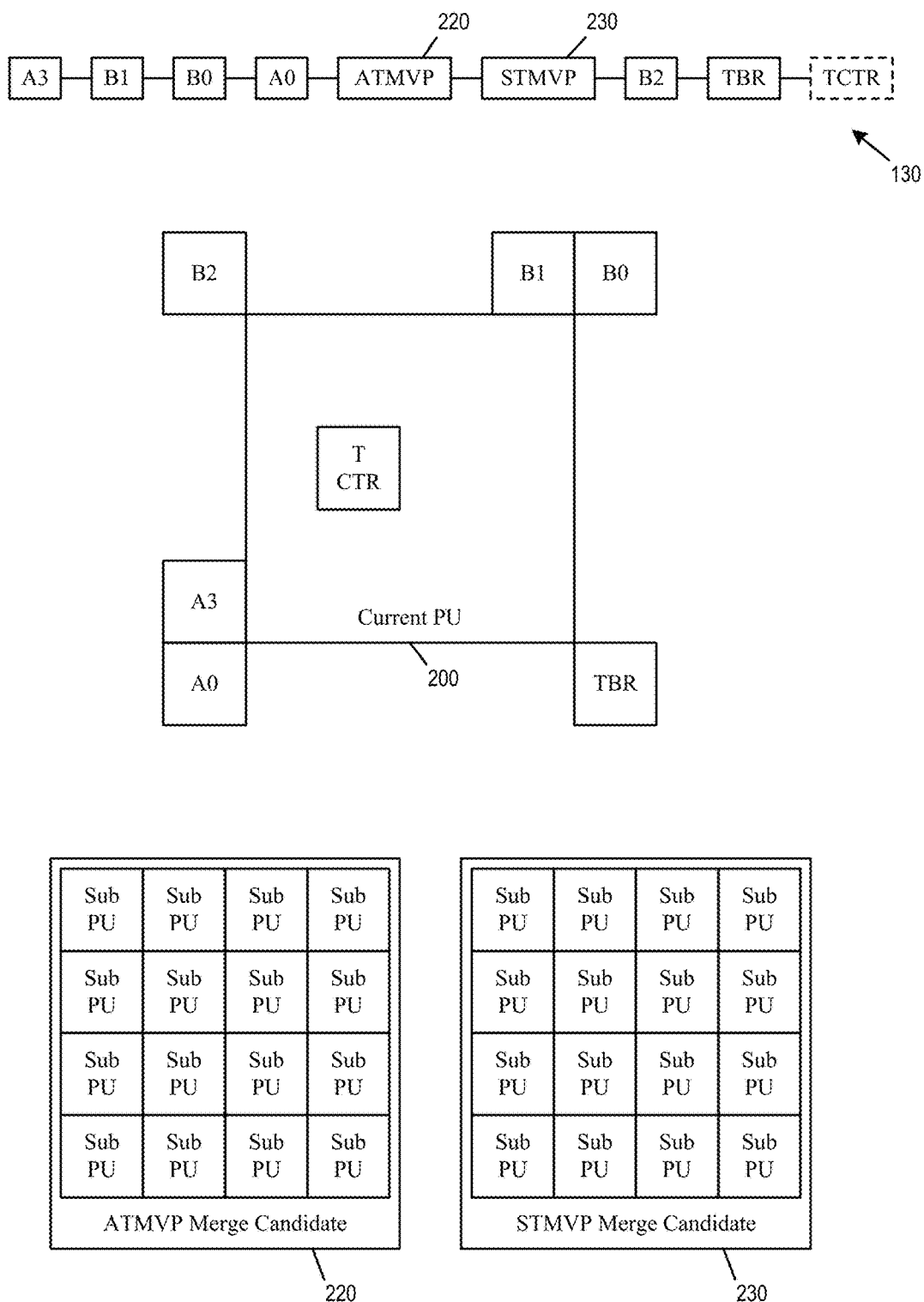
FIG. 2 conceptually illustrates the merge candidates of the merge candidate list.

FIG. 2 conceptually illustrates the merge candidates of the merge candidate list 130. As illustrated, the merge candidate list 130 includes candidates A3, B1, B0, A0, B2, TBR, etc. These merge candidates are based on motion information of the spatial and/or temporal neighbors of a current PU 200 of the block of pixels 120. The merge candidate list 130 also includes one or more sub-PU merge candidates. A sub-PU merge candidate includes multiple sets of motion information for multiple sub-PUs of the current PU. In the example, the current PU 200 is divided into 16 sub-PUs, a sub-PU merge candidate can therefore have up to 16 different sets of motion information for the 16 sub-PUs.

The merge candidate list 130 includes a sub-PU merge candidate 220 and a sub-PU merge candidate 230. The sub-PU merge candidate 220 is created based on Advanced Temporal Motion Vector Prediction (ATMVP). The sub-PU merge candidate 230 is created based on Spatial Temporal Motion Vector Prediction (STMVP). Though not illustrated in FIG. 2, a merge candidate list may have multiple ATMVP candidates (based on different initial vectors) and multiple STMVP candidates.

Figures 3A, 3B:
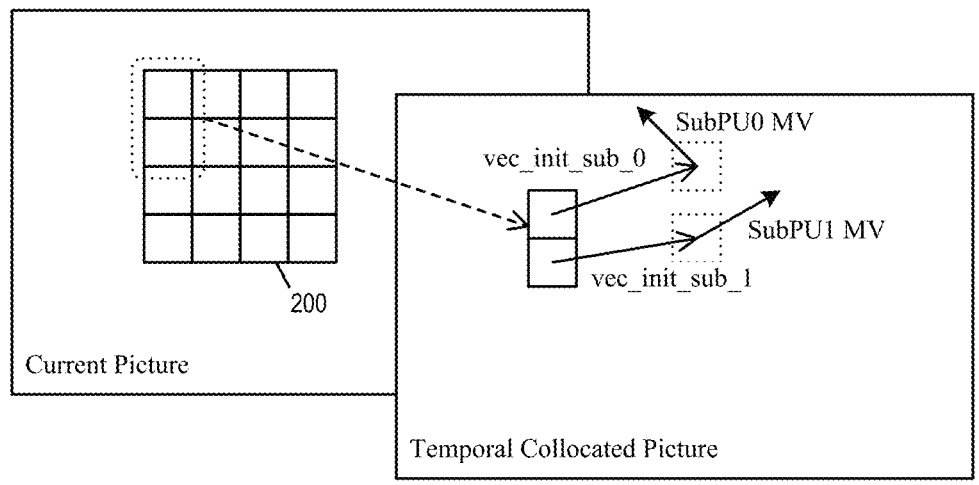
FIG. 3a conceptually illustrates the derivation of an ATMVP candidate.
FIG. 3b conceptually illustrates the derivation of a STMVP candidate.

FIG. 3a conceptually illustrates the derivation of an ATMVP candidate. As illustrated, an initial motion vector of the PU 200 is used to determine initial motion vectors for different sub-PUs. The initial motion vector of each sub-PU is in turn used to determine the motion information or temporal predictor for the sub-PU in a collocated picture. ATMVP will be further described below in Section II.

FIG. 3b conceptually illustrates the derivation of a STMVP candidate. In the example, the motion information for sub-PU (A1,1) is derived based on MVs or motion information from its top spatial neighbors T1, its left spatial neighbor L1, and its own temporal neighbor. The motion information for sub-PU (A2,1) is derived based on motion information from its top spatial neighbors T2, its left spatial neighbor sub-PU(A1,1), and its temporal neighbor. The derivation is recursively applied to all sub-PUs of the current PU 200 in raster scan order. STMVP will be further described below in Section III.

As mentioned, the reduced merge candidate signaling method skips or partially skips the generation of some sub-PU merge candidates when building a merge candidate list for a block of pixels. This allows the video codec to greatly reduce the computation time associated with generating the merge candidate list, since generating the complete set of motion information for a sub-PU merge candidate can be computationally expensive. A video codec performing the reduced merge candidate signaling method partially constructs a sub-PU merge candidate by generating or identifying a first set of data for the sub-PU merge candidate. The video codec may generate a second set of data based on the first set of data to complete the sub-PU merge candidate later if necessary.

In some embodiments, the first set of data includes the motion information of a subset of the sub-PUs in the current PU. In some embodiments, the first set of data includes a set of initial or intermediate data that are generated during the process to generate the sub-PU merge candidate. In some embodiments, the first set of data includes motion information of spatially and/or temporally neighboring blocks.

Figure 4A:
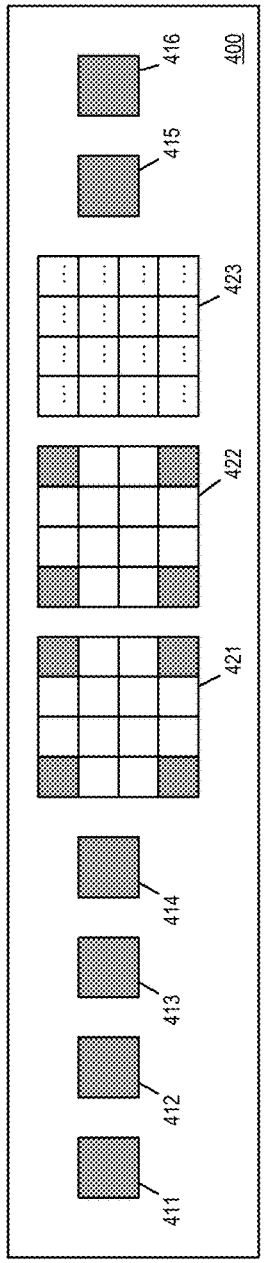
FIGS. 4a-c conceptually illustrate the partial construction of sub-PU merge candidates.
Figure 4B:
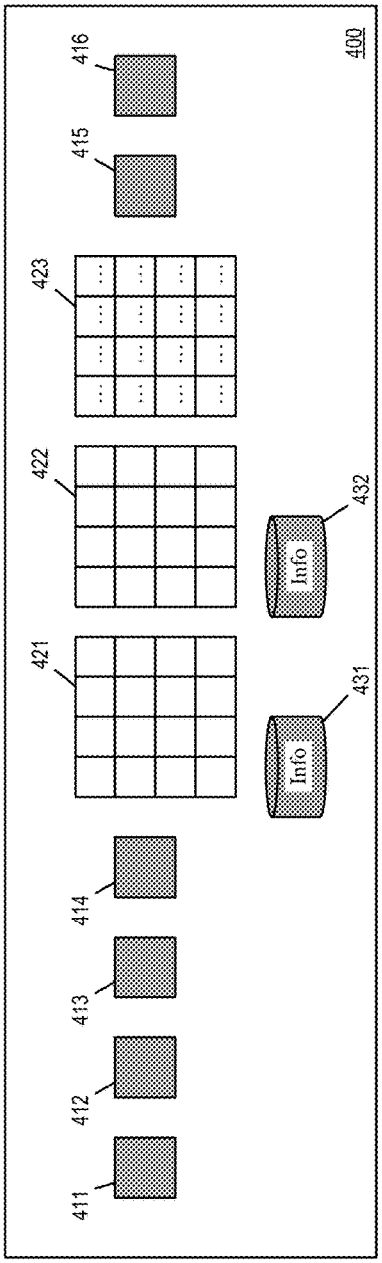
Figure 4C:
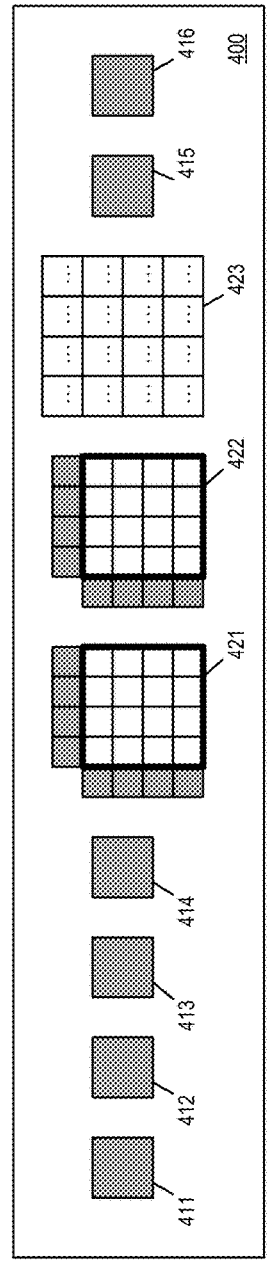

FIGS. 4a-c conceptually illustrate the partial construction of sub-PU merge candidates. The figures illustrate a merge candidate list 400 that includes normal merge candidates 411-416 and sub-PU merge candidate 421-423. The normal or non-sub-PU merge candidates 411-416 are illustrated as shaded to indicate that they are candidates with complete sets of motion information. The sub-PU merge candidates 421-423 are not fully shaded to indicate that they are partially constructed and do not have complete sets of motion information. The sub-PU merge candidate 421-422 are generated by a first sub-PU merge mode, while the sub-PU merge candidate 423 is generated by a second, different sub-PU merge mode.

FIG. 4a illustrates partially constructed sub-PU merge candidates that include motion information for some of the sub-PUs but not all sub-PUs. Specifically, for sub-PU merge candidates 421 and 422, the video codec has generated or identified motion information for some sub-PUs (for examples, at the corners of the PU) while other sub-PUs do not have any motion information. (Sub-PUs illustrated as shaded are sub-PUs for which motion information are generated; sub-PUs illustrated as blank are sub-PUs for which motion information are not yet generated).

FIG. 4b illustrates partially constructed sub-PU merge candidates for which the video codec has generated initial or intermediate information. As illustrated, the video codec has generated initial information 431-432 for sub-PU merge candidates 421-422, respectively.

An example of the initial or intermediate information for a sub-PU merge candidate is the initial motion vector that is identified under ATMVP mode. (sub-PUs of the sub-PU merge candidates 421-422 are illustrated as blank to indicate that the motion information are not yet generated for those sub-PUs.) As another example, in some embodiments, when generating the ATMVP merge candidate, the video decoder only performs the candidate building process before an availability checking operation, then stops the candidate building operation when the availability checking operation is done. The candidate building process for the ATMVP merge candidate, including the availability checking operation, is further described in Section II below.

FIG. 4c illustrates partially constructed sub-PU merge candidates for which the video codec has identified motion information in spatially and/or temporally neighboring blocks. As illustrated, for the sub-PU merge candidates 421-422, the video codec has identified motion information in neighboring blocks outside of the current PU. These motion information of neighboring blocks (including neighboring MV) will be used to compute the motion information of the sub-PU merge candidates 421-422 (such as under STMVP mode). The video codec has not computed motion information for the sub-PUs of the sub-PU merge candidates 421-422.

The video codec performs pruning operations to detect and remove one or more redundant merge candidates from the merge candidate list. When performing pruning operations, the video codec may perform one or more types of pruning operations that eliminate one or more merge candidates from the merge candidate list, particularly sub-PU related pruning operations. Section IV below describes three different types of sub-PU related pruning operations, including Union Pruning, sub-PU MI Pruning, and Special MI Pruning. The video codec may turn off one or more types of sub-PU related pruning operations when building the merge candidate list.

A video codec implementing the reduced merge candidate signaling method may also perform one or more simplified pruning operations in addition to or instead of the three sub-PU related pruning operations. Unlike the three types of sub-PU related pruning operations described in Section IV in which all motion information of a sub-PU merge candidate are used to identify redundant merge candidates to prune off, a simplified pruning operation is one in which only a subset or none of the motion information of the sub-PU merge candidate is used to identify a merge candidate to prune. In other words, at least some of the motion information of the sub-PU merge candidate is not considered for simplified pruning. In some embodiments, the video codec performs simplified pruning based on information already available in the partially constructed sub-PU merge candidates. In other words, motion information unavailable in the partially sub-PU merge candidate are not considered for simplified pruning.

For example, in some embodiments, the video codec prunes one ATMVP candidate by another ATMVP candidate by comparing their initial motion vectors. In some embodiments, the video codec prunes a STMVP candidate by another STMVP candidate if the neighboring MVs used to derive the two STMVP candidates are sufficiently similar, or if the motion information of a particular subset of sub-PUs (e.g., the MV at the four corner sub-PUs) of the two STMVP candidates are sufficiently similar. In some embodiments, the video codec prunes a non-sub-PU merge candidate by a sub-PU merge candidate if the motion information of a particular subset of sub-PUs in the sub-PU merge candidate is the same as the motion information of the non-sub-PU merge candidate.

Figure 5:
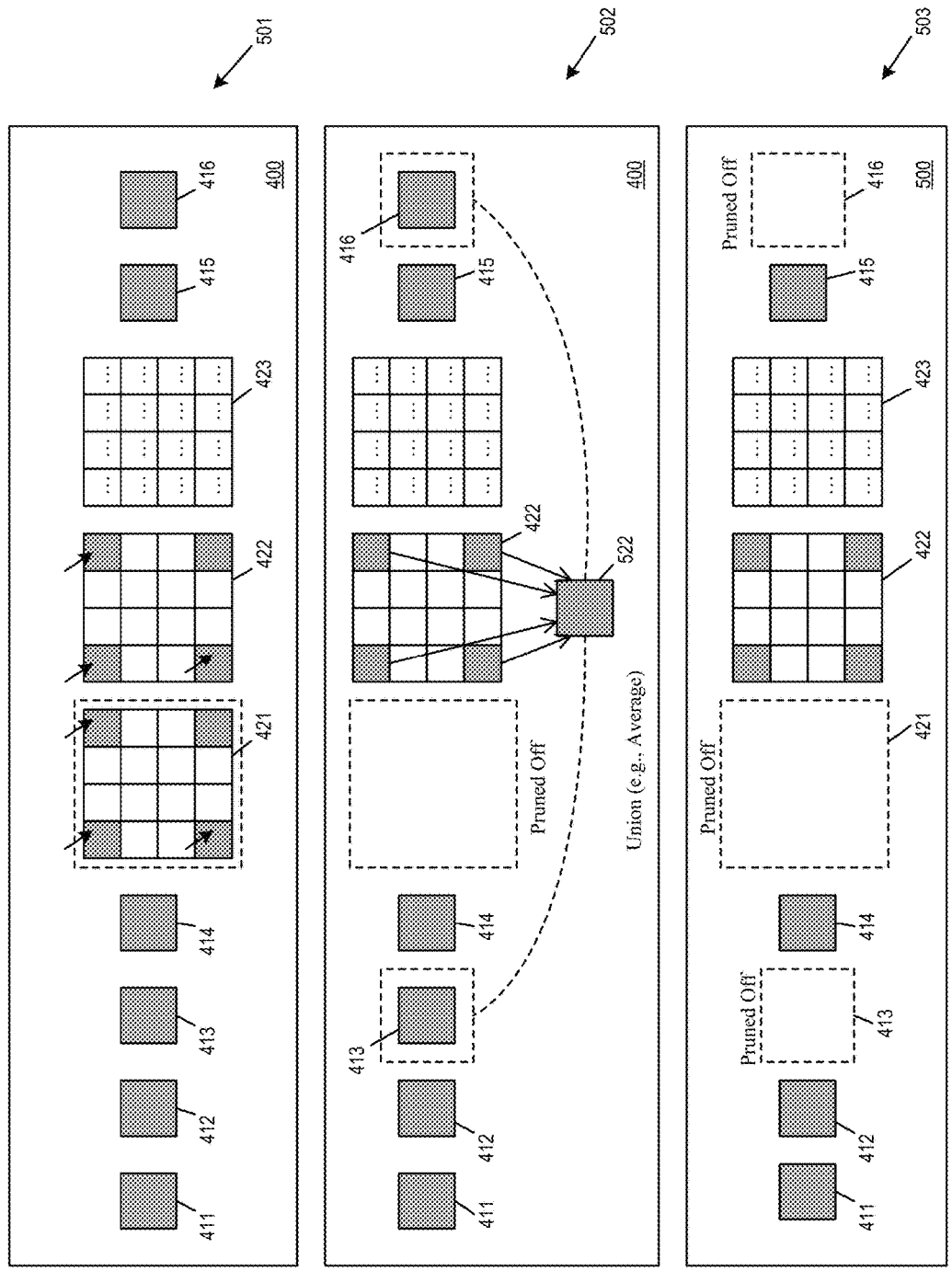
FIG. 5 conceptually illustrates a simplified pruning operation that is based on comparison with partially constructed sub-PU merge candidates.

FIG. 5 conceptually illustrates a simplified pruning operation that is based on comparison with partially constructed sub-PU merge candidates. The figure illustrates the video codec using a partially constructed sub-PU merge candidate to identify and prune off redundant merge candidates from the merge candidate list 400. The figure illustrates the simplified pruning operation in three stages 501-503.

The first stage 501 illustrates using a partially constructed sub-PU merge candidate to identify other sub-PU merge candidate for pruning. In the example, the partially constructed sub-PU merge candidate is one for which the video codec has generated motion information for some of the sub-PUs but not all sub-PUs (described in FIG. 4a). One of ordinary skill would understand that the simplified pruning operations described can also be based on other types of partially constructed sub-PU merge candidates, such as sub-PU merge candidates with only initial or intermediate data (described in FIG. 4b) or sub-PU merge candidates with only neighboring motion information (described in FIG. 4c). Generally, the video codec implementing the reduced merge candidate signaling method identifies a merge candidate to remove by comparing the first set of data of the partially constructed sub-PU merge candidate with a corresponding set of data of another merge candidate in the merge candidate list. In some embodiments, a partially constructed sub-PU merge candidate may have more motion information than what is necessary for performing simplified pruning operations.

As illustrated, the video codec compares the motion information of the sub-PU merge candidate 421 with the motion information of the sub-PU merge candidate 422 at certain specific sub-PUs (marked by arrows) but not for all sub-PUs. The partially constructed sub-PU merge candidates have motion information for those specific sub-PUs but not all sub-PUs. In the example, the video codec has determined that the motion information of the sub-PU merge candidates 421 and 422 are identical or sufficiently similar at the specific sub-PUs so that one of the two sub-PU merge candidates 421-422 can be pruned off from the merge candidate list 400.

The second stage 502 illustrates using a partially constructed sub-PU merge candidate to identify one or more non-sub-PU merge candidates for pruning. Specifically, the available motion information of sub-PU merge candidate 422 is used to generate a unified motion information 522 that can be used to compare with normal or non-sub-PU merge candidates. The unified motion information 522 may be an average of the available motion information of the partially constructed sub-PU merge candidate 422, or an average of the motion information of a certain specific set of sub-PUs (e.g., corner sub-PUs of the current PU). In some embodiments, the video codec uses the unified motion information 522 for comparison with normal or non-sub-PU merge candidates only when the motion information of the different sub-PUs in the partially constructed sub-PU merge candidates 422 are identical or substantially similar with each other.

In the example, the unified motion information 522 of the sub-PU merge candidate is compared with the non-sub-PU merge candidates 411-416. Based on the comparison, the video codec determines that the motion information of the merge candidates 413 and 416 are identical or substantially similar to the unified motion information 522 so that merge candidates 413 and 416 are to be pruned off from the merge candidate list 400.

The third stage 503 shows a pruned merge candidate list 500 after the simplified pruning operation has identified and removed some redundant merge candidates. As illustrated, the merge candidates 413, 416, and 421 have been removed from the candidate list 400 to create the pruned candidate list 500 that includes merge candidates 411, 412, 414, 422, 423, 415.

A video encoder implementing the reduced merge candidate signaling method encodes the block of pixels by selecting a merge candidate from the pruned candidate list 500. The video encoder generates a merge index to indicate the position of the selected merge candidate in the pruned merge candidate list 500. In order to select the best merge candidate, the video encoder completes the partially constructed sub-PU merge candidates. The complete set of motion information is then available to the video encoder to select the most suitable merge candidate to encode the current block of pixels.

Figure 6:
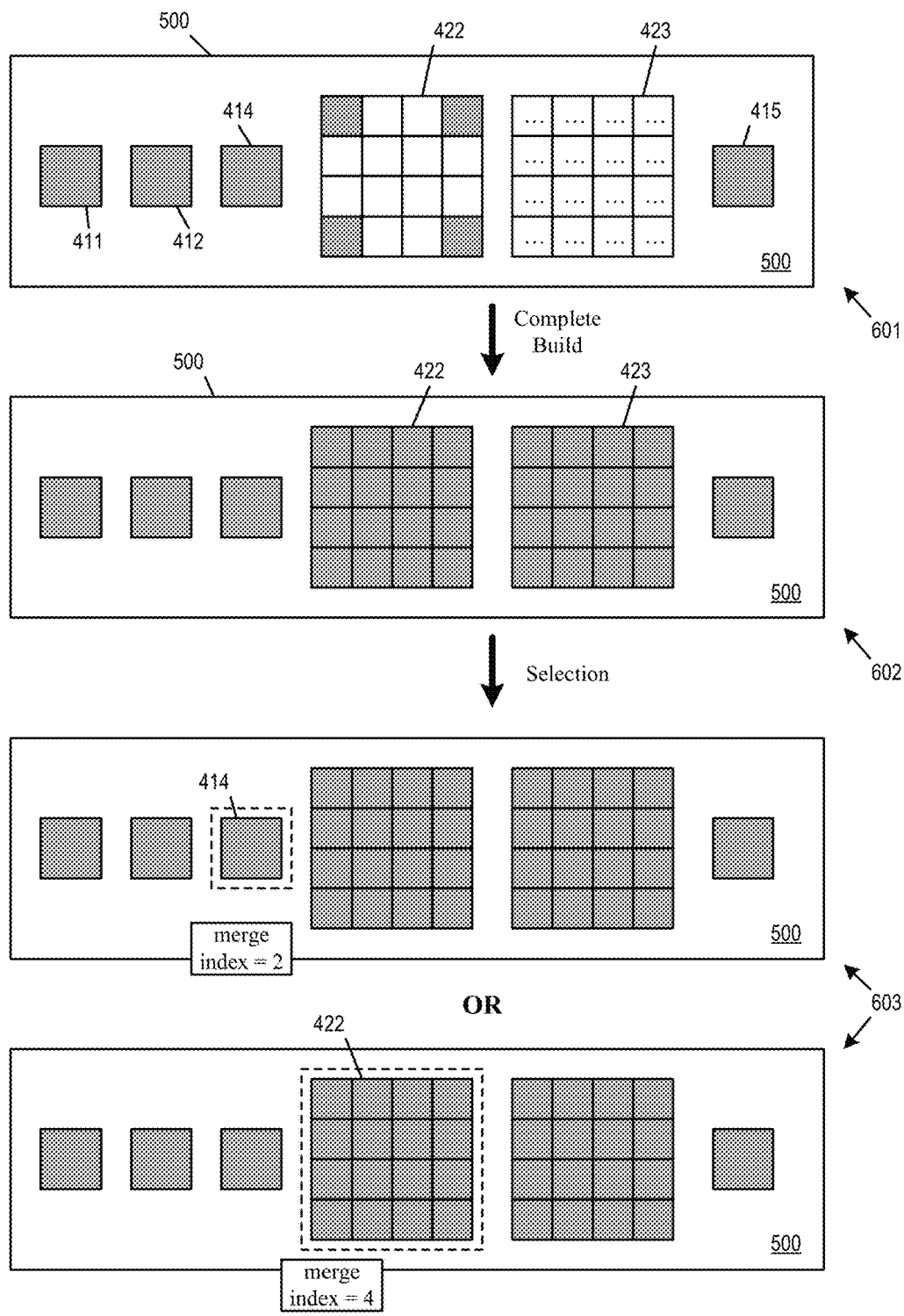
FIG. 6 illustrates the video encoder selecting a merge candidate from the pruned merge candidate list by completing the construction of the sub-PU merge candidates.

FIG. 6 illustrates the video encoder selecting a merge candidate from the pruned merge candidate list 500 by completing the construction of the sub-PU merge candidates. The figure shows the selection process in three stages 601-603.

As shown in the first stage 601, the pruned merge candidate list 500 includes two partially constructed sub-PU merge candidates 422, 423. These two sub-PU merge candidates may be generated under different sub-PU merge modes (e.g. ATMVP and STMVP). The sub-PU merge candidate 422 may only have motion information for some of the sub-PUs, while the sub-PU merge candidate 423 may only have motion information of its spatial and temporal neighbors.

At the second stage 602, the video encoder completes generating the motion information of all sub-PUs for both the sub-PU merge candidate 422 and the sub-PU merge candidate 423. The completion of the sub-PU merge candidates are based on the information available in the partially constructed sub-PU merge candidates. In other words, the video encoder completes construction of the sub-PU merge candidate by generating a second set of data based on the first set of data of the sub-PU merge candidate.

The third stage 603 shows the video encoder selecting a merge candidate from the pruned merge candidate list 500, now that the sub-PU merge candidates 422 and 423 are completely constructed. The video encoder may select a non-sub-PU merge candidate (candidate 414 in the example) or a sub-PU merge candidate (candidate 422 in the example.) The video encoder then generates a merge index that indicates the position of the selected candidate in the pruned merge candidate list 500. In the example, the merge index is 2 if the candidate 414 is selected and 4 if the candidate 422 is selected. In some embodiments, the video encoder may reorder the pruned merge candidate list 500 and the value of the merge index is based on such reordering.

A video decoder implementing the reduced merge candidate signaling method is configured to match a video encoder implementing the reduced merge candidate signaling method such that the encoder and the decoder perform the identical sub-PU related pruning operations based on identically constructed sub-PU merge candidates that may be partially constructed. However, the video decoder may select a merge candidate from a merge candidate list in which the sub-PU merge candidates remain incomplete or partially constructed, i.e., the video decoder need not build a complete merge candidate list when selecting a candidate, unlike the video encoder. To improve efficiency, the video decoder may therefore not fully build each sub-PU merge candidate when constructing the merge candidate list. (In some embodiments, the video decoder may bypass a sub-PU merge candidate and fill the entry in the merge candidate list for the sub-PU merge candidate with a placeholder candidate.)

After the video decoder completes the partial building process of sub-PU merge candidates, the video decoder may receive a merge index for selecting a merge candidate from the merge candidate list. If the selected merge candidate is a sub-PU merge candidate, the video decoder would fully build the selected sub-PU merge candidate. Sub-PU merge candidates that are not selected would remain unbuilt.

Figure 7:
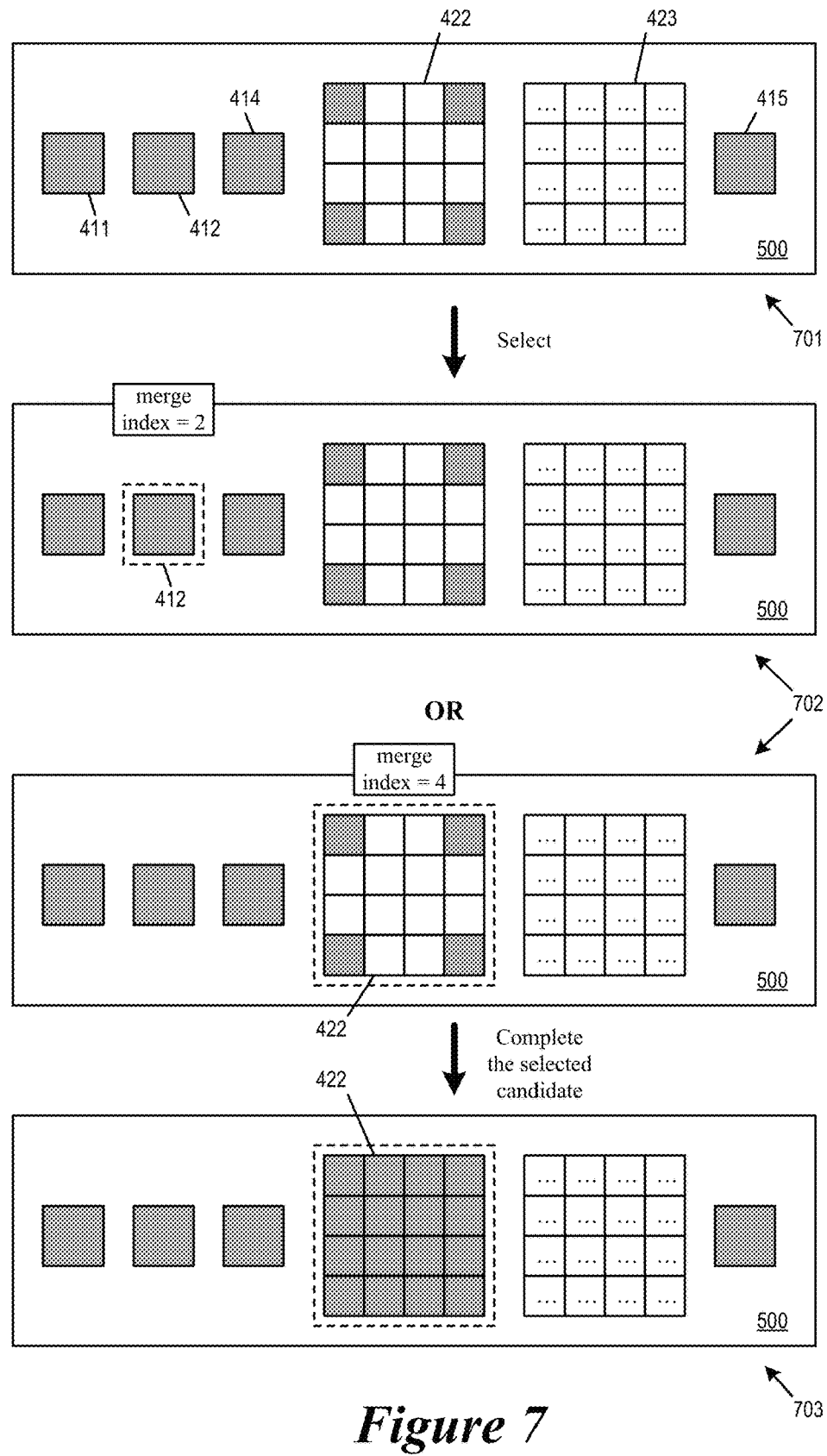
FIG. 7 conceptually illustrates the video decoder selecting a merge candidate from the pruned merge candidate list having partially constructed merge candidates.

FIG. 7 conceptually illustrates the video decoder selecting a merge candidate from the pruned merge candidate list 500 having partially constructed merge candidates. The video decoder would complete the construction of a sub-PU merge candidate only if the sub-PU merge candidate is the selected candidate. The figure shows the selection process in three stages 701-703.

As shown in the first stage 701, the pruned merge candidate list 500 includes two partially constructed sub-PU merge candidates 422 and 423 that do not have complete motion information.

The second stage 702 shows the video decoder receiving a merge index and selecting a merge candidate. The merge index indicates the position of the selected merge index in the pruned merge candidate list 500. The figure provides two scenarios, one for when the merge index selects a non-sub-PU merge candidate, and another for when the merge index selects a sub-PU merge candidate.

If the merge index selects a non-sub-PU merge candidate (candidate 412 selected by merge index=2 in the example), the video decoder may proceed to decoding the block of pixels by using the selected non-sub-PU merge candidate, since the selected merge candidate is already complete. The video decoder would not expend computing resource to complete the partially constructed sub-PU merge candidates 422 and 423 since they will not be used. If the merge index selects a sub-PU merge candidate (candidate 422 selected by merge index=4 in the example), the video decoder would complete generation of the selected partial sub-PU merge candidate.

The third stage 703 shows the video decoder completing the construction of the selected sub-PU merge candidate. In the example, the video decoder would fully build the sub-PU merge candidate 422 since it is selected for decoding the current PU. The partially constructed sub-PU merge candidate 423 would remain partially constructed since it is not selected and will not be used.

Figure 8:
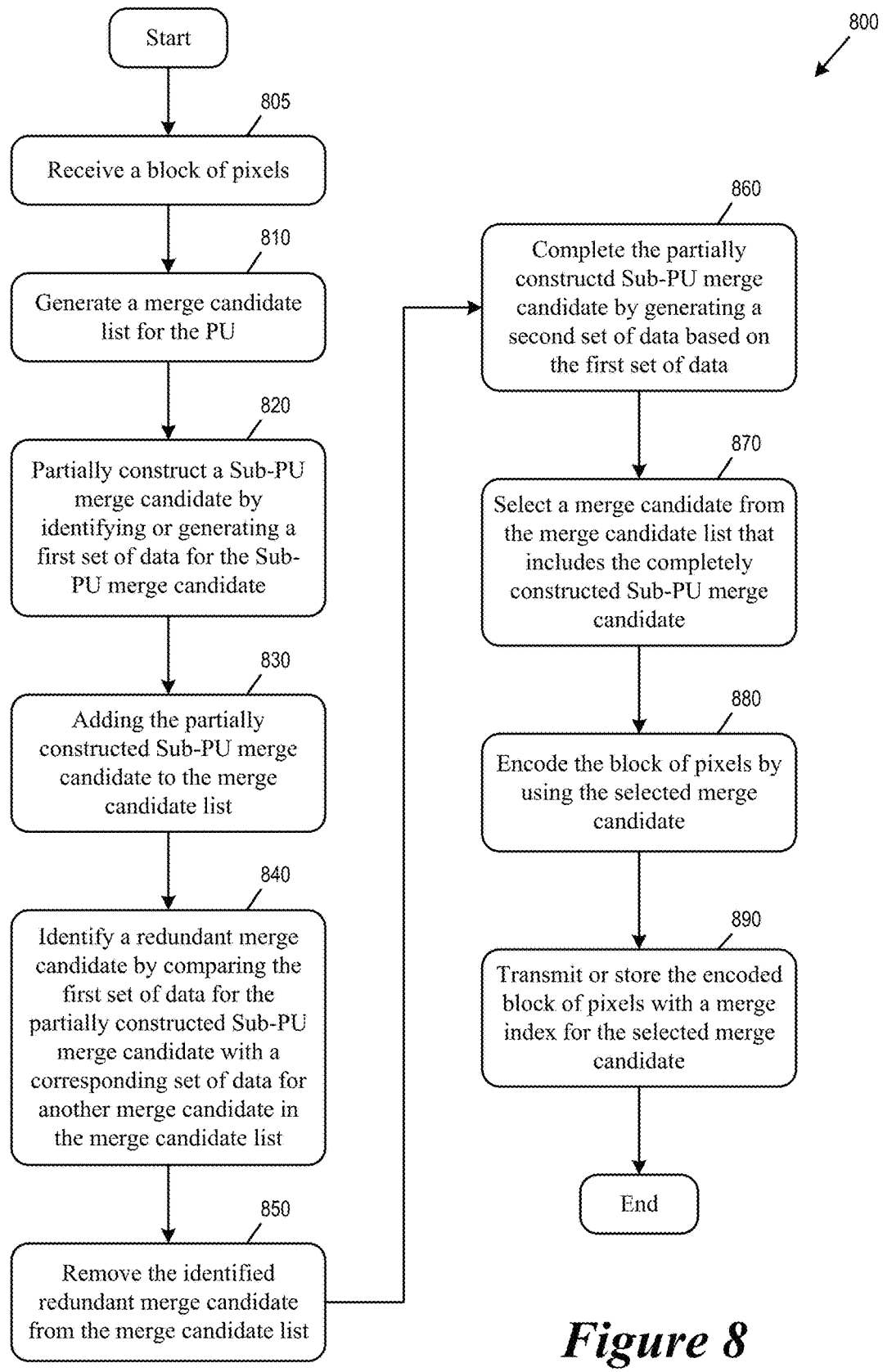
FIG. 8 conceptually illustrates a process that that a video encoder performs when it encodes a block of pixels according to the reduced merge candidate signaling method.

FIG. 8 conceptually illustrates a process 800 that that a video encoder performs when it encodes a block of pixels according to the reduced merge candidate signaling method. Specifically, the video encoder uses a merge candidate list that includes partially constructed sub-PU merge candidates and performs simplified pruning on the merge candidate list.

In some embodiments, one or more processing units (e.g., a processor) of a computing device implementing the video encoder 1200 performs the process 800 by executing instructions stored in a computer readable medium. In some embodiments, an electronic apparatus implementing the video encoder 1200 performs the process 800.

The process 800 starts when the video encoder receives (at step 805) a block of pixels. The block of pixels will be encoded as a coding unit (CU) or a prediction unit (PU). The video encoder generates (at step 810) a merge candidate list for the PU. The merge candidate list may include one or more merge candidates that are not divided into sub-PUs.

The video encoder partially constructs (at step 820) a sub-PU merge candidate by identifying or generating a first set of data for the sub-PU merge candidate. The sub-PU merge candidate can be generated under ATMVP mode, STMVP mode, or another sub-PU merge mode. The first set of data of the sub-PU merge candidate may include the motion information of a subset of the sub-PUs in the PU, a set of initial or intermediate data that are generated during the process to generate the sub-PU merge candidate, or motion information of spatially and/or temporally neighboring blocks of the PU. Partial generation or construction of sub-PU merge candidate is described by reference to FIGS. 4a-c above. The video encoder then adds (at step 830) the partially constructed sub-PU merge candidate to the merge candidate list.

The video encoder identifies (at step 840) a redundant merge candidate by comparing the first set of data for the partially constructed sub-PU merge candidate with a corresponding set of data for another merge candidate in the merge candidate list. In other words, the video encoder performs simplified pruning operations based on the partially constructed sub-PU merge candidates. (Simplified pruning is described by reference to FIG. 5 above.) In some embodiments, the video encoder also performs pruning operations described in Section IV for fully constructed sub-PU merge candidates. The video encoder then removes (at step 850) the identified redundant merge candidate from the merge candidate list. This creates a pruned merge candidate list at the video encoder.

The video encoder completes (at step 860) the partially constructed sub-PU merge candidate by generating a second set of data based on the first set of data. The second set of data may include motion data for the sub-PUs that do not have motion data in the partially constructed sub-PU merge candidate. If there are other partially constructed sub-PU merge candidates in the merge candidate list, the video encoder would complete them as well. After this step, all sub-PU merge candidates in the merge candidate list are fully constructed to include the complete sets of motion information.

The video encoder selects (at step 870) a merge candidate from the pruned merge candidate list that includes the completely constructed sub-PU merge candidate(s). The video encoder then encodes (at step 880) the block of pixels by using the selected merge candidate to perform motion compensation. The video encoder also transmits (at step 890) or stores the encoded block of pixels with a merge index that indicates the position of the selected merge candidate in the merge candidate list. The process 800 then ends and the video encoder encodes the next block of pixels. The complete construction of sub-PU merge candidates and the selection of merge candidates by a video encoder is described by reference to FIG. 6 above.

Figure 9:
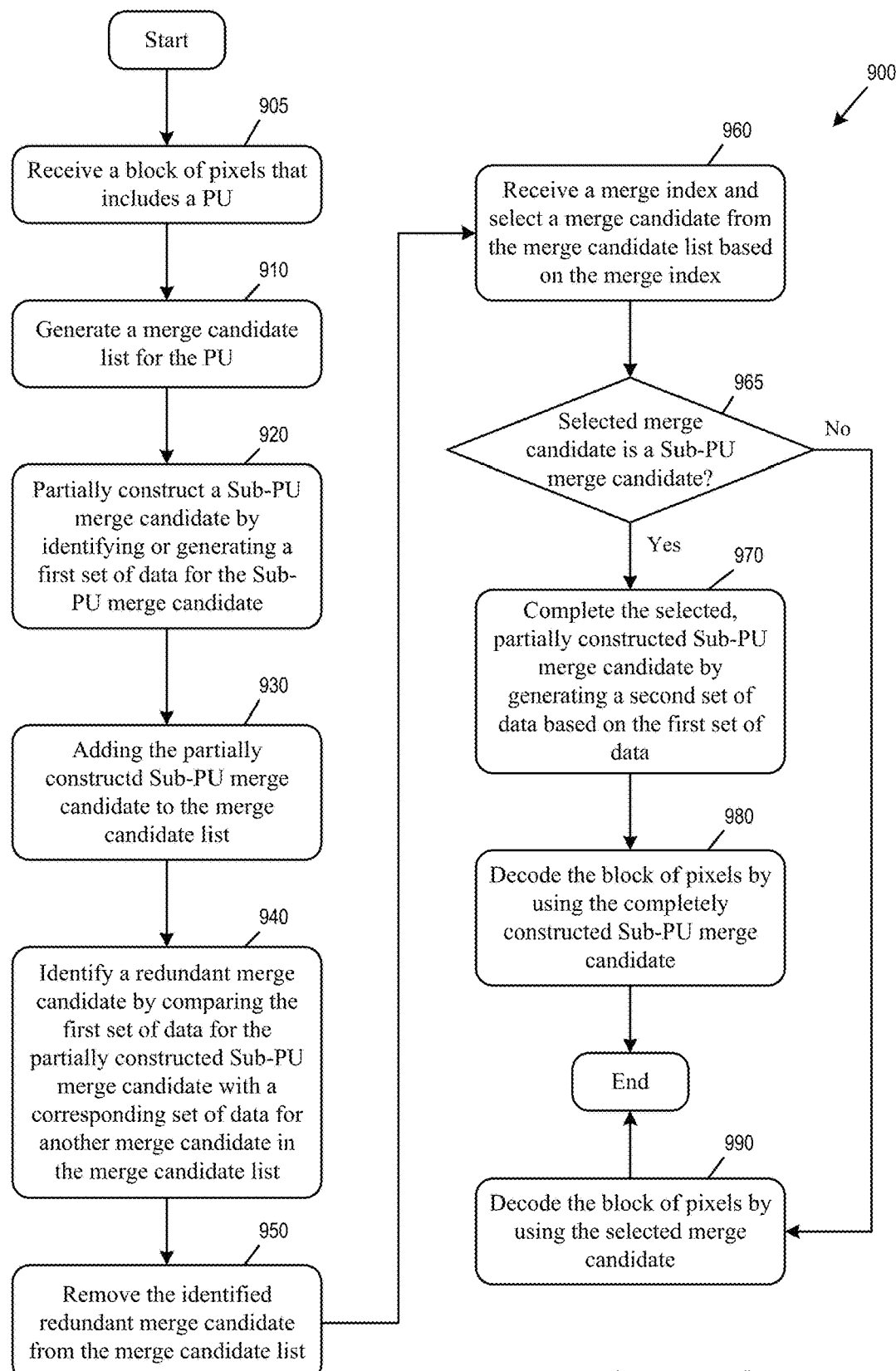
FIG. 9 conceptually illustrates a process that a video decoder performs when it decodes a block of pixels according to the reduced merge candidate signaling method.

FIG. 9 conceptually illustrates a process 900 that a video decoder performs when it decodes a block of pixels according to the reduced merge candidate signaling method. Specifically, the video decoder uses a merge candidate list that includes partially constructed sub-PU merge candidates and performs simplified pruning on the merge candidate list.

In some embodiments, one or more processing units (e.g., a processor) of a computing device implementing the video decoder 1400 performs the process 900 by executing instructions stored in a computer readable medium. In some embodiments, an electronic apparatus implementing the video decoder 1400 performs the process 900.

The process 900 starts when the video decoder receives (at step 905) a block of pixels that is encoded as a PU or CU. The video decoder generates (at step 910) a merge candidate list for the PU. The merge candidate list may include one or more merge candidates that are not divided into sub-PUs.

The video decoder partially constructs (at step 920) a sub-PU merge candidate by identifying or generating a first set of data for the sub-PU merge candidate. The sub-PU merge candidate can be generated under ATMVP mode, STMVP mode, or another sub-PU merge mode. The first set of data of the sub-PU merge candidate may include the motion information of a subset of the sub-PUs in the PU, a set of initial or intermediate data that are generated during the process to generate the sub-PU merge candidate, or motion information of spatially and/or temporally neighboring blocks of the PU. Partial generation or construction of sub-PU merge candidate is described by reference to FIGS. 4*a-c* above. The video decoder then adds (at step 930) the partially constructed sub-PU merge candidate to the merge candidate list.

The video decoder identifies (at step 940) a redundant merge candidate by comparing the first set of data of the partially constructed sub-PU merge candidate with a corresponding set of data for another merge candidate in the merge candidate list. In other words, the video decoder performs simplified pruning operations based on the partially constructed sub-PU merge candidates. Simplified pruning is described by reference to FIG. 5 above. In some embodiments, the video decoder also performs pruning operations described in Section IV for fully constructed sub-PU merge candidates. The video decoder then removes (at step 950) the identified redundant merge candidate from the merge candidate list. This creates a pruned merge candidate list at the video decoder.

The video decoder receives (at step 960) a merge index and select a merge candidate from the merge candidate list based on the merge index. The video decoder determines (at step 965) whether the selected merge candidate is a sub-PU merge candidate. If so, the process proceeds to 970. If the selected candidate is not a sub-PU merge candidate, the process proceeds to 990.

At step 970, the video decoder completes the selected, partially constructed sub-PU merge candidate by generating a second set of data for the partially constructed sub-PU merge candidate based on the first set of data of the partially constructed sub-PU merge candidate. The second set of data may include motion data for the sub-PUs that do not have motion data in the partially constructed sub-PU merge candidate. The video decoder does not complete partially constructed sub-PU merge candidates that are not selected by the merge index, i.e., when the selected merge candidate is not the partially constructed sub-PU merge candidate, the second set of data for the sub-PU merge candidate would not be generated. The selection of a sub-PU merge candidates by the video decoder is described by reference to FIG. 7 above.

The video decoder decodes (at step 980) the block of pixels (i.e., the PU of the block of pixels) by using the completed sub-PU merge candidate, e.g., by performing motion compensation based on the motion information in the completed sub-PU merge candidate. The process 900 then ends and the video decoder moves on to decode the next PU or block of pixels.

At step 990, the video decoder decodes the block of pixels by using the selected merge candidate (which is not a sub-PU merge candidate). The process 900 then ends and the video decoder moves on to decode the next PU or block of pixels.

In some embodiments, when a particular condition (denoted Condition_SubPU_Skip) for skipping sub-PU merge candidate generation is met, a video codec implementing the reduced merge candidate signaling method proceeds to skip or partially skip the generation of some sub-PU merge candidates when building the merge candidate list. When the condition Condition_SubPU_Skip is not met, the video codec implementing the reduced merge candidate signaling method generates the complete set of sub-PU merge candidates when building the merge candidate list. In some embodiments, the particular condition Condition_SubPU_Skip is always met. In some embodiments, whether the particular condition Condition_SubPU_Skip is met is determined based the size of the current PU, e.g., whether the PU size is larger than a threshold or whether the PU size is smaller than a threshold.

In some embodiments, the video codec uses a flag to indicate whether the reduced merge candidate signaling method is enabled or disabled. When the flag is not present, the value of the flag is inferred to be 1 (e.g., skipping method enabled). The flag can be signaled in a video coding standard compliant bitstream in sequence level, picture level, slice level, or PU level.

In some embodiments, the video encoder implementing the reduced merge candidate signaling method does not perform any pruning (whether simplified pruning or the pruning methods described in Section IV) and selects a merge candidate from the unpruned merge candidate list. The video decoder implementing the reduced merge candidate signaling method likewise do not perform any pruning. The video decoder does not fully construct any sub-PU merge candidate, unless one of the sub-PU merge candidate is selected in which case the video decoder would fully construct only the selected sub-PU merge candidate while leaving the non-selected sub-PU merge candidates unconstructed or partially constructed.

Figure 10:
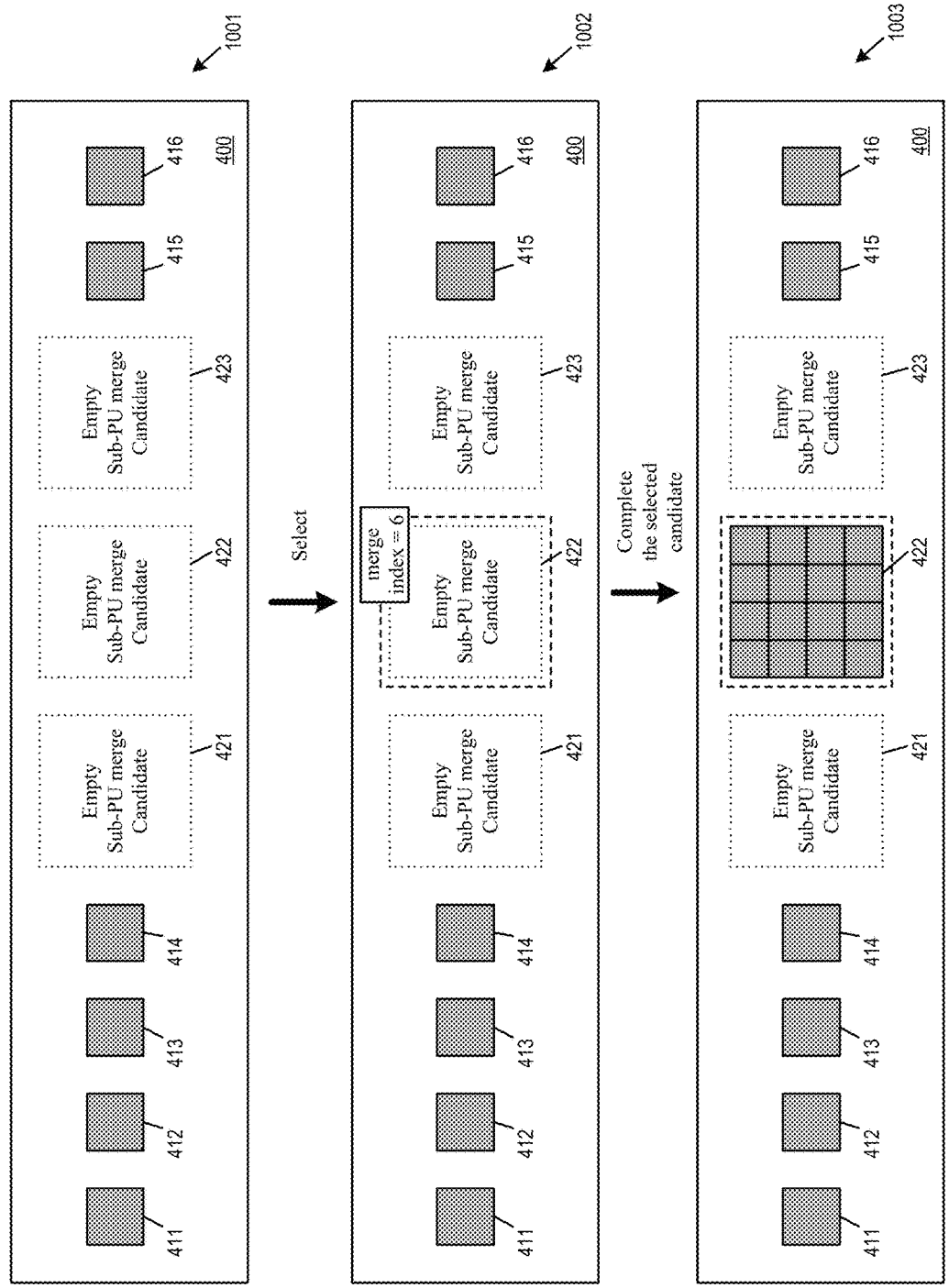
FIG. 10 conceptually illustrates the selection of a sub-PU merge candidate from an unpruned merge candidate list.

FIG. 10 conceptually illustrates the selection of a sub-PU merge candidate from an unpruned merge candidate list.

Specifically, the figure illustrates the selection of a merge candidate from the merge candidate list 400 without performing any pruning at the video decoder 1400 in three stages 1001-1003.

At the first stage 1001, the video decoder generates the merge candidate list 400, which includes non-sub-PU merge candidates 411-416 and sub-PU merge candidates 421-423. However, the constructions the sub-PU merge candidates 421-423 are skipped or incomplete. In some embodiments, the video decoder creates empty or placeholder merge candidates in place of the skipped sub-PU merge candidates 421-423. (Such a placeholder merge candidate may be filled with pre-defined motion information, garbage value, or without any value.)

Though not illustrated, the video encoder 1200 also generates the merge candidate list 400. However, the merge candidate list 400 generated by the video encoder 1200 may include fully or partially constructed sub-PU merge candidates, and the video encoder selects a candidate based on the fully or partially constructed sub-PU merge candidates.

The second stage 1002 shows the selection of a sub-PU merge candidate in the unpruned merge candidate list 400. This is unlike the selection of a merge candidate as illustrated in FIGS. 6 and 7, in which the selection is from a pruned merge candidate list. The video encoder selects a sub-PU merge candidate from the unpruned candidate list 400 and provides a corresponding merge index to the video decoder. The merge index (6) is the position of the selected merge candidate in the unpruned candidate list 400. The video decoder uses the merge index to select the sub-PU merge candidate 422, which is a skipped merge candidate that is neither fully nor partially constructed.

The third stage 1003 shows the video decoder completing the selected sub-PU merge candidate 422 so that the information of the sub-PU merge candidate 422 can be used for motion compensation and decode of the current PU or block of pixels. Other skipped sub-PU merge candidates 421 and 423 remain empty placeholders or incomplete.

Figure 11:
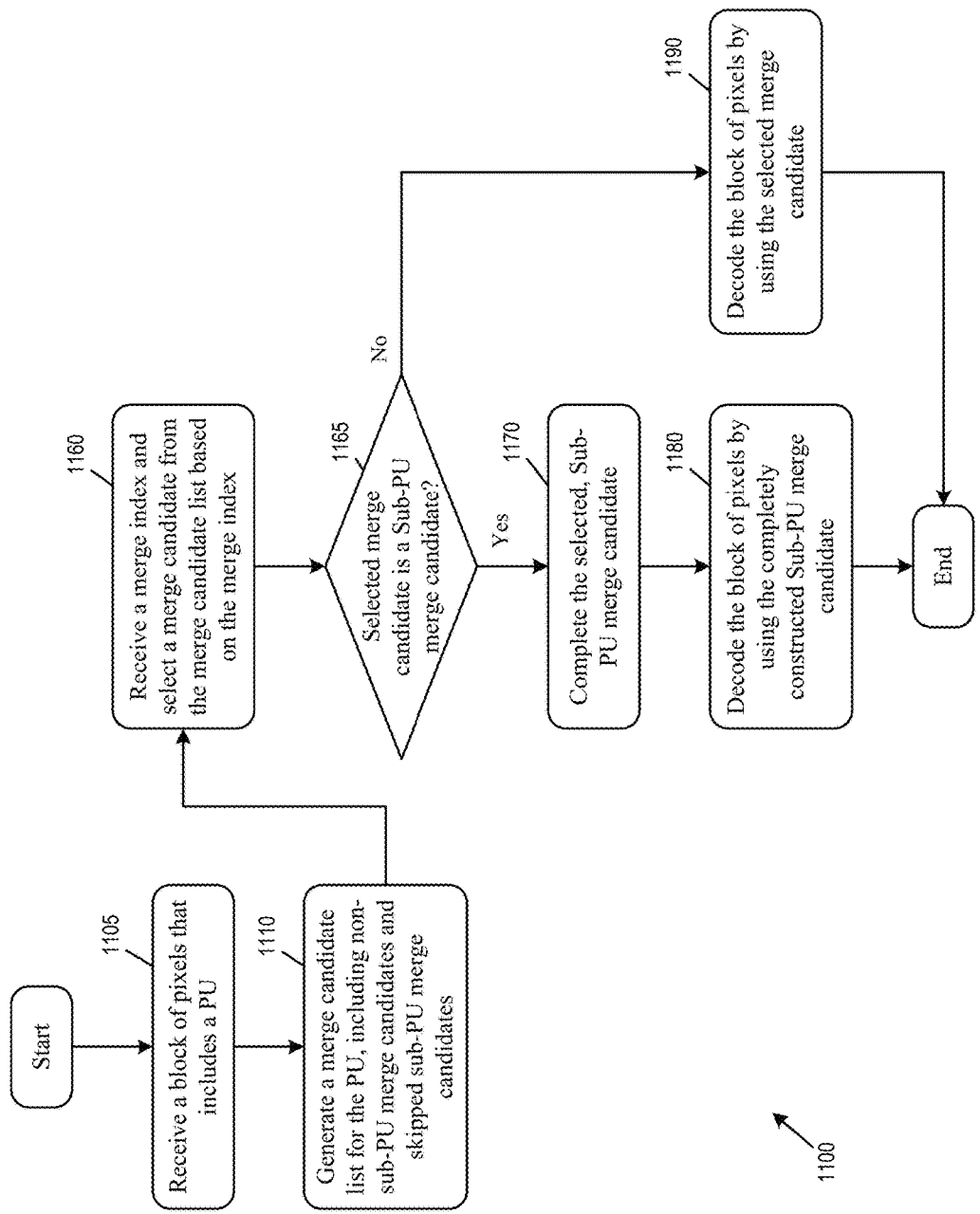
FIG. 11 conceptually illustrates a process that a video decoder performs when it selects a merge candidate from an unpruned merge candidate list that includes one or more skipped sub-PU merge candidates.

FIG. 11 conceptually illustrates a process 1100 that a video decoder performs when it selects a merge candidate from an unpruned merge candidate list that includes one or more skipped sub-PU merge candidates. In some embodiments, one or more processing units (e.g., a processor) of a computing device implementing the video decoder 1400 performs the process 900 by executing instructions stored in a computer readable medium. In some embodiments, an electronic apparatus implementing the video decoder 1400 performs the process 1100.

The process 1100 starts when the video decoder receives (at step 905) a block of pixels that is encoded as a PU or CU. The video decoder generates (at step 1110) a merge candidate list for the PU that includes non-sub-PU merge candidates and skipped sub-PU merge candidates, e.g., sub-PU merge candidates that are empty placeholders without real motion information, or sub-PU merge candidates that are incompletely constructed. The merge candidate list would remain unpruned. The process then proceeds to 1160.

The video decoder receives (at step 1160) a merge index and select a merge candidate from the unpruned merge candidate list based on the merge index. The video decoder determines (at step 1165) whether the selected merge candidate is a sub-PU merge candidate. If so, the process proceeds to 1170. If the selected candidate is not a sub-PU merge candidate, the process proceeds to 1190.

At step 1170, the video decoder completes the selected sub-PU merge candidate. The video decoder decodes (at step 1180) the block of pixels (i.e., the PU of the block of pixels) by using the completed sub-PU merge candidate, e.g., by performing motion compensation based on the motion information in the completed sub-PU merge candidate. The process 1100 then ends and the video decoder moves on to decode the next PU or block of pixels.

At step 1190, the video decoder decodes the block of pixels by using the selected merge candidate (which is not a sub-PU merge candidate). The process 1100 then ends and the video decoder moves on to decode the next PU or block of pixels.

II. Advanced Temporal Motion Vector Prediction (ATMVP)

To improve the coding efficiency, a sub-PU Temporal Motion Vector Prediction (TMVP) mode, known as Advanced Temporal Motion Vector Prediction (ATMVP) mode, is added to merge mode, and an ATMVP merge candidate can be added to the merge candidate list. In some embodiments, there can only be one ATMVP candidate in the merge candidate list.

The ATMVP merge candidate is derived from an initial motion vector identifying a corresponding block of the current PU in a reference picture, where multiple sets of motion information from the corresponding block is extracted and assigned to sub-PUs of the PU. Each sub-PU of the PU is motion compensated separately. A process by which the ATMVP mode generates the ATMVP merge candidate is described in following Steps 1 through 5.

Step 1: for the current PU, the ATMVP mode finds an "initial motion vector", which is denoted it as vec_init. By definition, the vec_init is the first available list of the first available spatial neighboring block. For example, if the first available spatial neighboring block has L0 and L1 MV, and LX is the first list for searching collocated information, then the vec_init uses L0 MV if LX=L0, L1 if LX=L1. The value of LX (L0 or L1) depends on which list (L0 or L1) is better for collocated information, if L0 is better for collocated information (e.g., POC distance closer than L1), then LX=L0, and vice versa. LX assignment can be slice level or picture level.

A collocated picture searching process is used to find a main collocated picture for all sub-PU in the ATMVP mode. The main collocated picture is denoted as main_colpic. The collocated picture searching process searches the reference picture selected by the first available spatial neighboring block, and then searches all reference picture of current picture. For B-slices, the searching process starts from L0 (or L1), reference index 0, then index 1, then index 2, and so on. If the searching process finishes searching L0 (or L1), it then searches another list. For P-slices, the searching process searches the reference picture selected by the first available spatial neighboring block, and then searches all reference picture of current picture of the list starting from reference index 0, then index 1, then index 2, and so on.

For each searched picture, the collocated picture searching process performs availability checking for motion information. When performing availability checking, a scaled version of vec_init (denoted as vec_init_scaled) is added to an around-center position of the current PU. The added position is then used to check for prediction type (intra/inter) of the searched picture. The around-center position can be (i) the center pixel (PU size M*N, center=position (M/2, N/2)), (ii) the center sub-PU's center pixel, or (iii) a combination of (i) and (ii) depending on the shape of the current PU, or (iv) some other position. If the prediction type is an inter type, then the motion information is available (availability is true). if the prediction type is an intra type, then the motion information is not available (availability is false). When the searching process completes availability checking, if the motion information is available, then current searched picture is recorded as the main collocated picture. If the motion information is not available, then the searching process proceeds to search next picture.

The collocated picture searching process performs MV scaling to create the scaled version of vec_init (i.e., vec_init_scaled) when the reference picture of the vec_init is not the current reference picture. The scaled version of vec_init is created based on the temporal distances between the current picture, the reference pictures of the vec_init, and the searched reference picture.

Step 2: For each sub-PU, the ATMVP mode further finds an initial motion vector for the sub-PU, which is denoted as vec_init_sub_i (i=0~((M/P)×(N/Q)−1)). By definition, vec_init_sub_i=vec_init_scaled.

Step 3: For each sub-PU, the ATMVP mode finds a collocated picture for reference list 0 and a collocated picture for reference list 1. By definition, there is only one collocated picture (i.e., main_colpic) for reference list 0 and reference list 1 for all sub-PUs of the current PU.

Step 4: For each sub-PU, the ATMVP mode finds collocated location in the collocated picture according to:

collocated location x=sub-PU_i_x+integer(vec_init_sub_i_x)+shift_x collocated location y=sub-PU_i_y+integer(vec_init_sub_i_y)+shift_y The term sub-PU_i is the current sub-PU. The term sub-PU_i_x is the horizontal left-top location of sub-PU_i inside the current picture (integer location); sub-PU_i_y is the vertical left-top location of sub-PU_i inside the current picture (integer location); vec_init_sub_i_x is the horizontal part of vec_init_sub_i (integer portion only); vec_init_sub_i_y is the vertical part of vec_init_sub_i (integer portion only); shift_x is a shift value that can be half of sub-PU width; and shift_y is a shift value that can be half of sub-PU height.

Step 5: For each sub-PU, the ATMVP mode finds the motion information temporal predictor, which is denoted as SubPU_MI_i. The SubPU_MI_i is the motion information (MI) from collocated_picture_i_L0 and collocated_picture_i_L1 on the collocated location calculated in Step 4. The MI of a collocated MV is defined as the set of {MV_x, MV_y, reference lists, reference index, other merge-mode-sensitive information}. The merge-mode sensitive information may information such as include local illumination compensation flag. MV_x and MV_y may be scaled according to the temporal distances between collocated picture, current picture, and reference picture of the collocated MV.

III. Spatial-Temporal Motion Vector Prediction (STMVP)

STMVP mode also adds a sub-PU based merge candidate to merge mode. The motion vectors of the sub-PUs are generated recursively in raster scan order. The derivation of MV for a current sub-PU is to (i) retrieve MVs from the current sub-PU's two spatial neighbors and one temporal neighbor (these MVs are also referred to as neighboring MVs), (ii) perform MV scaling on the retrieved MVs, and (iii) average the available MVs (up to 3) as the MV of the current sub-PU. The detailed description of the STMVP mode can be found in Joint Video Exploration Team (JVET) of ITU-T SG 16 WP 3 and ISO/IEC JTC 1/SC 29/VVG11: 3rd Meeting: Geneva, CH, 26 May-1 Jun. 2016; Document Title: Algorithm Description of Joint Exploration Test Model 3. In this document, STMVP is described in section 2.3.1.2: Spatial-temporal motion vector prediction (STMVP).

IV. Pruning of Sub-PU Merge Candidates

The sub-PU merge modes (including ATMVP mode and STMVP mode) employ pruning to improve coding efficiency. Pruning is a process to remove a candidate from the candidate list. There are three types of pruning: (1) Union Pruning, (2) sub-PU MI Pruning, and (3) Special MI Pruning of ATMVP (only for ATMVP, not for STMVP).

A. Union Pruning

Under Union Pruning, if the motion information of the different sub-PUs of the current PU are identical or sufficiently similar, the different sub-PUs of the PU can be treated as a single block. The PU's sub-PU merge candidates (e.g., ATMVP, STMVP) can be treated as the one unified merge candidate. This unified sub-PU merge candidate of the PU can be used to further prune non-sub-PU candidates of the PU. Conversely, a non-sub-PU merge candidate of the PU can be used to prune the sub-PU merge candidate. Here, the motion information of a sub-PU is defined as the set of {MV_x, MV_y, reference lists, reference index, other merge-mode-sensitive information.} The merge-mode sensitive information may include information such as local illumination compensation flag or inherited affine flag.

B. Sub-PU MI Pruning

Sub-PU MI Pruning compares the motion information of sub-PUs between two sub-PU merge candidates (by e.g., ATMVP, STMVP) at corresponding sub-PU positions (by comparing the motion information of sub-PU(0,0), sub-PU (0,1), etc. of the two sub-PU merge candidates). If the motion information of all corresponding sub-PUs between the two sub-PU merge candidates are identical or sufficiently similar, one of the two sub-PU merge candidate can be pruned off from the merge candidate list.

C. Special MI Pruning of ATMVP

Here the "Special MI" refers to the motion information from the collocated reference picture at the position coordinate of the availability checking performed for ATMPV. More precisely, during the availability checking phase of the ATMVP process, the ATMVP process checks the prediction type (intra/inter) of a certain coordinate Coord_avachk on the collocated picture. The motion information at this coordinate Coord_avachk is referred to as Special MI. The Special MI Pruning of ATMVP compares the Special MI of the current ATMVP merge candidate to the MI of a non-sub-PU merge candidate in the candidate list. If the motion information are the same, the non-sub-PU merge candidate can be pruned off from the merge candidate list.

V. Example Video Encoder

Figure 12:
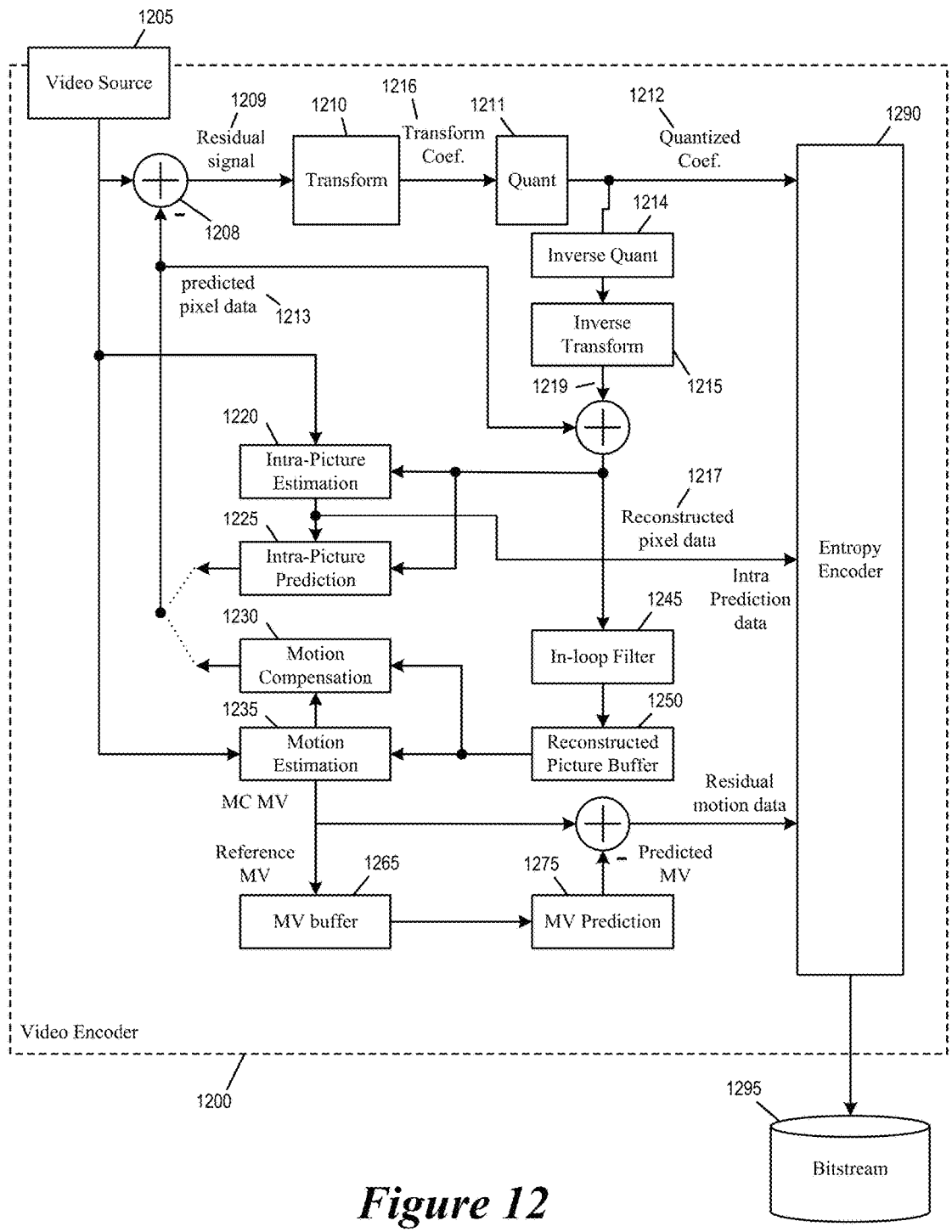
FIG. 12 illustrates an example video encoder that may implement the reduced merge candidate signaling method described above.

FIG. 12 illustrates an example video encoder 1200 that may implement the reduced merge candidate signaling method described above. As illustrated, the video encoder 1200 receives input video signal from a video source 1205 and encodes the signal into bitstream 1295. The video encoder 1200 has several components or modules for encoding the video signal 1205, including a transform module 1210, a quantization module 1211, an inverse quantization module 1214, an inverse transform module 1215, an intra-picture estimation module 1220, an intra-picture prediction module 1225, a motion compensation module 1230, a motion estimation module 1235, an in-loop filter 1245, a reconstructed picture buffer 1250, a MV buffer 1265, and a MV prediction module 1275, and an entropy encoder 1290.

In some embodiments, the modules 1210-1290 are modules of software instructions being executed by one or more processing units (e.g., a processor) of a computing device or electronic apparatus. In some embodiments, the modules 1210-1290 are modules of hardware circuits implemented by one or more integrated circuits (ICs) of an electronic apparatus. Though the modules 1210-1290 are illustrated as being separate modules, some of the modules can be combined into a single module.

The video source 1205 provides a raw video signal that presents pixel data of each video frame without compression. A subtractor 1208 computes the difference between the raw video pixel data of the video source 1205 and the predicted pixel data 1213 from motion compensation 1230 or intra-picture prediction 1225. The transform 1210 converts the difference (or the residual pixel data or residual signal 1209) into transform coefficients (e.g., by performing Discrete Cosine Transform, or DCT). The quantizer 1211 quantized the transform coefficients into quantized data (or quantized coefficients) 1212, which is encoded into the bitstream 1295 by the entropy encoder 1290.

The inverse quantization module 1214 de-quantizes the quantized data (or quantized coefficients) 1212 to obtain transform coefficients, and the inverse transform module 1215 performs inverse transform on the transform coefficients to produce reconstructed residual 1219. The reconstructed residual 1219 is added with the prediction pixel data 1213 to produce reconstructed pixel data 1217. In some embodiments, the reconstructed pixel data 1217 is temporarily stored in a line buffer (not illustrated) for intra-picture prediction and spatial MV prediction. The reconstructed pixels are filtered by the in-loop filter 1245 and stored in the reconstructed picture buffer 1250. In some embodiments, the reconstructed picture buffer 1250 is a storage external to the video encoder 1200. In some embodiments, the reconstructed picture buffer 1250 is a storage internal to the video encoder 1200.

The intra-picture estimation module 1220 performs intra-prediction based on the reconstructed pixel data 1217 to produce intra prediction data. The intra-prediction data is provided to the entropy encoder 1290 to be encoded into bitstream 1295. The intra-prediction data is also used by the intra-picture prediction module 1225 to produce the predicted pixel data 1213.

The motion estimation module 1235 performs inter-prediction by producing MVs to reference pixel data of previously decoded frames stored in the reconstructed picture buffer 1250. These MVs are provided to the motion compensation module 1230 to produce predicted pixel data. Instead of encoding the complete actual MVs in the bitstream, the video encoder 1200 uses MV prediction to generate predicted MVs, and the difference between the MVs used for motion compensation and the predicted MVs is encoded as residual motion data and stored in the bitstream 1295.

The MV prediction module 1275 generates the predicted MVs based on reference MVs that were generated for encoding previously video frames, i.e., the motion compensation MVs that were used to perform motion compensation. The MV prediction module 1275 retrieves reference MVs from previous video frames from the MV buffer 1265. The video encoder 1200 stores the MVs generated for the current video frame in the MV buffer 1265 as reference MVs for generating predicted MVs.

The MV prediction module 1275 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1295 by the entropy encoder 1290.

The entropy encoder 1290 encodes various parameters and data into the bitstream 1295 by using entropy-coding techniques such as context-adaptive binary arithmetic coding (CABAC) or Huffman encoding. The entropy encoder 1290 encodes parameters such as quantized transform data and residual motion data into the bitstream 1295. The bitstream 1295 is in turn stored in a storage device or transmitted to a decoder over a communications medium such as a network.

The in-loop filter 1245 performs filtering or smoothing operations on the reconstructed pixel data 1217 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 13:
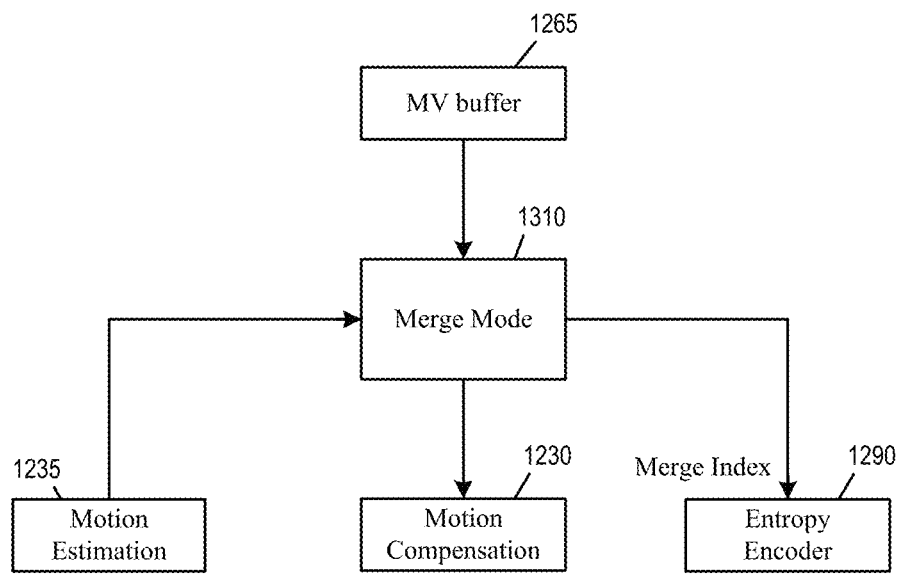
FIG. 13 illustrates portions of the video encoder that perform merge mode prediction.

FIG. 13 illustrates portions of the video encoder 1200 that perform merge mode prediction. As illustrated, the MV buffer 1265 stores motion information associated with previously encoded video pictures, including motion vectors of collocated pictures and reference pictures. A merge mode module 1310 retrieves motion information from the MV buffer 1265 to generate various merge candidates, including sub-PU merge candidates under ATMVP mode or STMVP mode. The merge mode module 1310 also performs pruning operations to remove redundant candidates from the merge candidate list. The merge mode module 1310 may skip or partially construct the sub-PU merge candidates and perform simplified pruning operations based on the partially constructed sub-PU merge candidates.

The merge mode module 1310 selects a merge candidate from the pruned merge candidate list based on input from the motion estimation module 1235. The merge mode module 1310 provides the motion information of the selected merge candidate to the motion compensation module 1230 for encoding the current PU. The merge mode module 1310 also generates a corresponding merge index to the entropy encoder 1290 for inclusion to the bitstream 1295.

VI. Example Video Decoder

Figure 14:
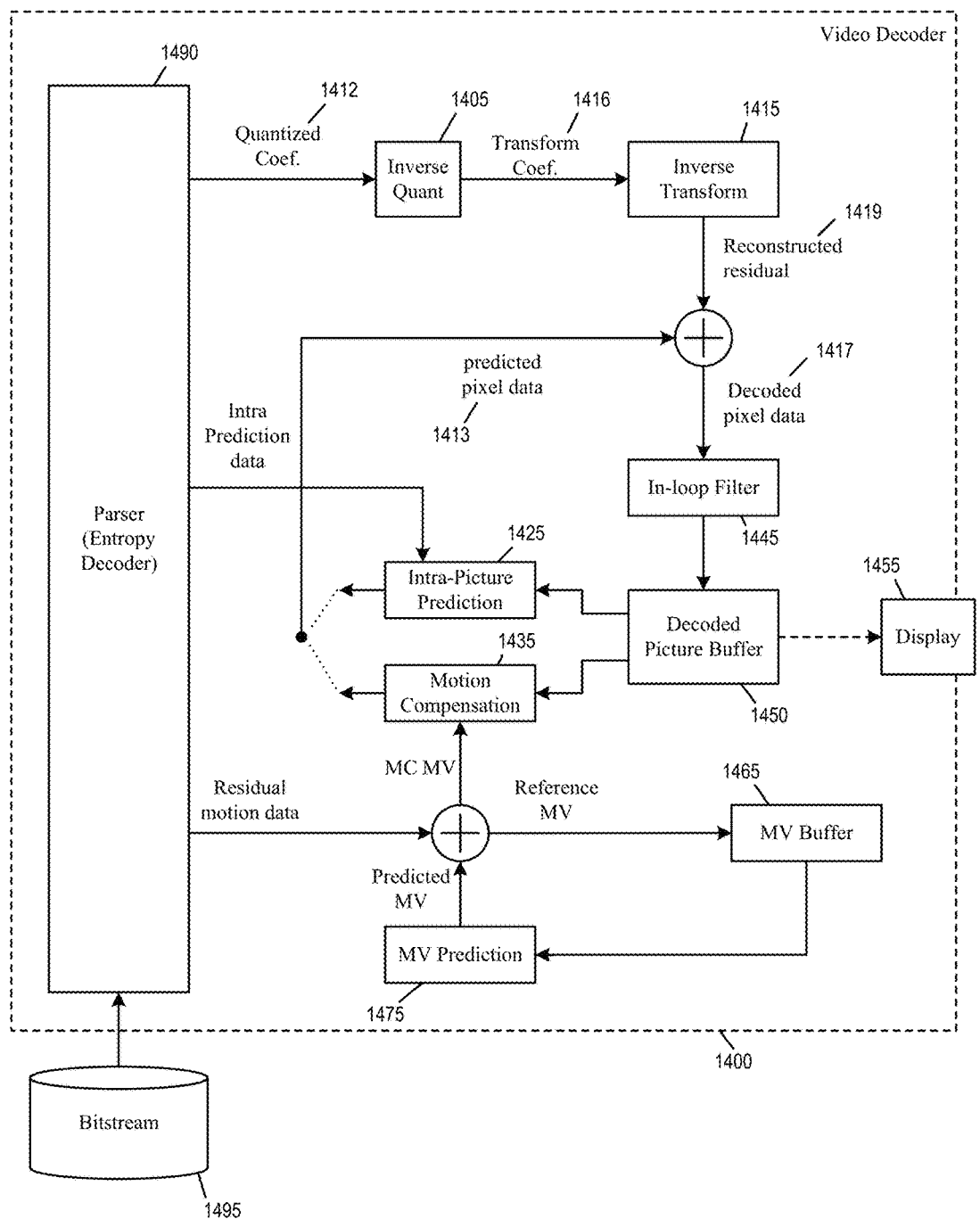
FIG. 14 illustrates an example video decoder that may implement the reduced merge candidate signaling method described above.

FIG. 14 illustrates an example video decoder 1400 that may implement the reduced merge candidate signaling method described above. As illustrated, the video decoder 1400 is an image-decoding or video-decoding circuit that receives a bitstream 1495 and decodes the content of the bitstream into pixel data of video frames for display. The video decoder 1400 has several components or modules for decoding the bitstream 1495, including an inverse quantization module 1405, an inverse transform module 1415, an intra-picture prediction module 1425, a motion compensation module 1435, an in-loop filter 1445, a decoded picture buffer 1450, a MV buffer 1465, a MV prediction module 1475, and a bitstream parser 1490.

In some embodiments, the modules 1410-1490 are modules of software instructions being executed by one or more processing units (e.g., a processor) of a computing device. In some embodiments, the modules 1410-1490 are modules of hardware circuits implemented by one or more ICs of an electronic apparatus. Though the modules 1410-1490 are illustrated as being separate modules, some of the modules can be combined into a single module.

The parser 1490 (or entropy decoder) receives the bitstream 1495 and performs initial parsing according to the syntax defined by a video-coding or image-coding standard. The parsed syntax element includes various header elements, flags, as well as quantized data (or quantized coefficients) 1412. The parser 1490 parses out the various syntax elements by using entropy-coding techniques such as context-adaptive binary arithmetic coding (CABAC) or Huffman encoding.

The inverse quantization module 1405 de-quantizes the quantized data (or quantized coefficients) 1412 to obtain transform coefficients, and the inverse transform module 1415 performs inverse transform on the transform coefficients 1416 to produce reconstructed residual signal 1419. The reconstructed residual signal 1419 is added with prediction pixel data 1413 from the intra-prediction module 1425 or the motion compensation module 1435 to produce decoded pixel data 1417. The decoded pixels data are filtered by the in-loop filter 1445 and stored in the decoded picture buffer 1450. In some embodiments, the decoded picture buffer 1450 is a storage external to the video decoder 1400. In some embodiments, the decoded picture buffer 1450 is a storage internal to the video decoder 1400.

The intra-picture prediction module 1425 receives intra-prediction data from bitstream 1495 and according to which, produces the predicted pixel data 1413 from the decoded pixel data 1417 stored in the decoded picture buffer 1450. In some embodiments, the decoded pixel data 1417 is also stored in a line buffer (not illustrated) for intra-picture prediction and spatial MV prediction.

In some embodiments, the content of the decoded picture buffer 1450 is used for display. A display device 1455 either retrieves the content of the decoded picture buffer 1450 for display directly or retrieves the content of the decoded picture buffer to a display buffer. In some embodiments, the display device receives pixel values from the decoded picture buffer 1450 through a pixel transport.

The motion compensation module 1435 produces predicted pixel data 1413 from the decoded pixel data 1417 stored in the decoded picture buffer 1450 according to motion compensation MVs (MC MVs). These motion compensation MVs are decoded by adding the residual motion data received from the bitstream 1495 with predicted MVs received from the MV prediction module 1475.

The MV prediction module 1475 generates the predicted MVs based on reference MVs that were generated for decoding previous video frames, e.g., the motion compensation MVs that were used to perform motion compensation. The MV prediction module 1475 retrieves the reference MVs of previous video frames from the MV buffer 1465. The video decoder 1400 stores the motion compensation MVs generated for decoding the current video frame in the MV buffer 1465 as reference MVs for producing predicted MVs.

The in-loop filter 1445 performs filtering or smoothing operations on the decoded pixel data 1417 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 15:
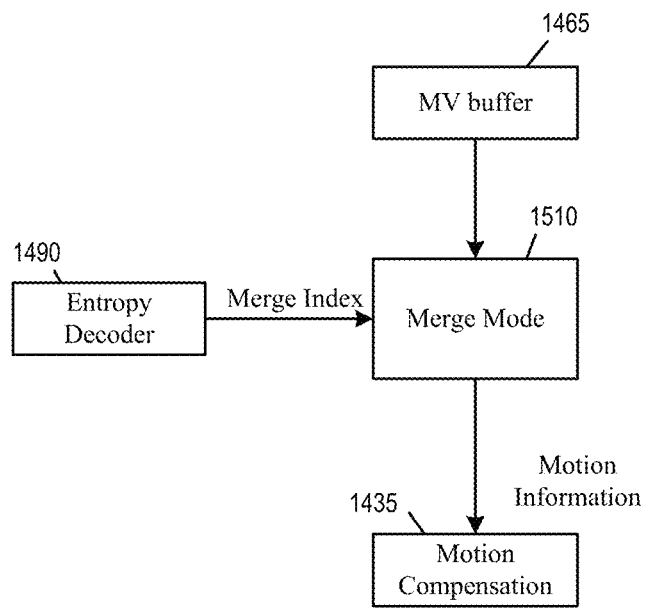
FIG. 15 illustrates portions of the video decoder that perform merge mode prediction.

FIG. 15 illustrates portions of the video decoder 1400 that perform merge mode prediction. As illustrated, the MV buffer 1465 stores motion information associated with previously decoded video pictures, including motion vectors of collocated pictures and reference pictures. A merge mode module 1510 retrieves motion information from the MV buffer 1465 to generate various merge candidates for a merge candidate list, including sub-PU merge candidates generated under ATMVP mode or STMVP mode. The merge mode module 1510 may also perform pruning operations to remove redundant candidates from the merge candidate list. The merge mode module 1510 may skip or partially construct the sub-PU merge candidates and perform simplified pruning operations based on the partially constructed sub-PU merge candidates.

The merge mode module 1510 selects a merge candidate from the pruned merge candidate list based on merge index that is parsed out from the bitstream 1495 by the entropy decoder 1490. If the selected merge candidate is a partially constructed sub-PU merge candidate, the merge module 1510 complete the construction of the selected sub-PU merge candidate. The merge mode module 1510 then provide the motion information of the selected merge candidate to the motion compensation module 1435 for decoding the current PU.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

FIG. 16 conceptually illustrates an electronic system 1600 with which some embodiments of the present disclosure are implemented. The electronic system 1600 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1600 includes a bus 1605, processing unit(s) 1610, a graphics-processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the GPU 1615, the read-only memory 1630, the system memory 1620, and the permanent storage device 1635.

From these various memory units, the processing unit(s) 1610 retrieves instructions to execute and data to process in order to execute the processes of the present disclosure. The processing unit(s) may be a single processor or a multi-core processor in different embodiments. Some instructions are passed to and executed by the GPU 1615. The GPU 1615 can offload various computations or complement the image processing provided by the processing unit(s) 1610.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the present disclosure use a mass-storage device (such as a magnetic or optical disk and its corresponding disk drive) as the permanent storage device 1635.

Other embodiments use a removable storage device (such as a floppy disk, flash memory device, etc., and its corresponding disk drive) as the permanent storage device. Like the permanent storage device 1635, the system memory 1620 is a read-and-write memory device. However, unlike storage device 1635, the system memory 1620 is a volatile read-and-write memory, such as random-access memory. The system memory 1620 stores some of the instructions and data that the processor needs at runtime. In some embodiments, processes in accordance with the present disclosure are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIGS. 8 and 9) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method comprising:
   receiving a block of pixels that comprises a prediction unit (PU);
   generating, for the PU, a merge candidate list comprising one or more merge candidates;
   partially constructing a sub-PU merge candidate by identifying or generating a first set of data for the sub-PU merge candidate;
   adding the partially constructed sub-PU merge candidate to the merge candidate list;
   identifying a redundant merge candidate by comparing the first set of data for the partially constructed sub-PU merge candidate with a corresponding set of data for another merge candidate in the merge candidate list; and
   removing the identified redundant merge candidate from the merge candidate list.

2. The method of claim 1, further comprising:
   completing the sub-PU merge candidate by generating a second set of data based on the first set of data;
   selecting a merge candidate from the merge candidate list that includes the completed sub-PU merge candidate; and
   encoding the block of pixels by using the selected merge candidate.

3. The method of claim 1, further comprising:
   selecting a merge candidate from the merge candidate list; and
   when the selected merge candidate is the sub-PU merge candidate, completing the sub-PU merge candidate by generating a second set of data based on the first set of data and decoding the block of pixels by using the completed sub-PU merge candidate.

4. The method of claim 3, wherein:
   the first set of data comprises motion information for a first subset of sub-PUs in the PU, and
   the second set of data comprises motion information for a second subset of sub-PUs in the PU.

5. The method of claim 1, wherein the sub-PU merge candidate is a first sub-PU merge candidate and the other merge candidate is a second sub-PU merge candidate, and wherein identifying the redundant merge candidate comprises comparing the motion information of the first subset of sub-PUs of the first sub-PU merge candidate with motion information of a corresponding subset of sub-PUs of the second sub-PU merge candidate.

6. The method of claim 1, wherein the other merge candidate is a non-sub-PU merge candidate, and wherein identifying the redundant merge candidate comprises comparing the motion information of a subset of the sub-PU of the sub-PU merge candidate with motion information of the non-sub-PU merge candidate.

7. The method of claim 1, wherein the sub-PU merge candidate is a first sub-PU merge candidate and the other merge candidate is a second sub-PU merge candidate, and wherein identifying the redundant merge candidate comprises comparing an initial motion vector of the first sub-PU merge candidate with an initial motion vector of the second sub-PU merge candidate.

8. The method of claim 1, wherein the sub-PU merge candidate is a first sub-PU merge candidate and the other merge candidate is a second sub-PU merge candidate, and wherein identifying the redundant merge candidate comprises comparing a neighboring motion vector of the first sub-PU merge candidate with a neighboring motion vector of the second sub-PU merge candidate.

9. The method of claim 1, wherein the partially constructing of the sub-PU merge candidate comprises generating the sub-PU merge candidate by determining initial motion vectors for different sub-PUs, and wherein the initial motion vectors for each sub-PU is used to identify motion information in a collocated picture.

10. The method of claim 1, wherein the partially constructing of the sub-PU merge candidate comprises generating the sub-PU merge candidate by determining an average motion vector for each sub-PU based on the sub-PU's two spatial neighbors and one temporal neighbor.

11. An electronic apparatus comprising:
a video encoder circuit capable of:
receiving a block of pixels that comprises a prediction unit (PU);
generating, for the PU, a merge candidate list comprising one or more merge candidates;
partially constructing a sub-PU merge candidate by identifying or generating a first set of data for the sub-PU merge candidate;
adding the partially constructed sub-PU merge candidate to the merge candidate list;
identifying a redundant merge candidate by comparing the first set of data for the partially constructed sub-PU merge candidate with a corresponding set of data for another merge candidate in the merge candidate list;
removing the identified redundant merge candidate from the merge candidate list;
completing the sub-PU merge candidate by generating a second set of data based on the first set of data;
selecting a merge candidate from the merge candidate list that includes the completed sub-PU merge candidate; and
encoding the block of pixels by using the selected merge candidate.

12. The electronic apparatus of claim 11, wherein:
the first set of data comprises motion information for a first subset of sub-PUs in the PU, and
the second set of data comprises motion information for a second subset of sub-PUs in the PU.

13. The electronic apparatus of claim 11, wherein the sub-PU merge candidate is a first sub-PU merge candidate and the other merge candidate is a second sub-PU merge candidate, and wherein, in identifying the redundant merge candidate, the video encoder circuit compares an initial motion vector of the first sub-PU merge candidate with an initial motion vector of the second sub-PU merge candidate, wherein the first sub-PU merge candidate is generated by determining initial motion vectors for different sub-PUs, wherein the initial motion vectors for each sub-PU is used to identify motion information in a collocated picture.

14. An electronic apparatus comprising:
a video decoder circuit capable of:
receiving a block of pixels that comprises a prediction unit (PU);
generating, for the PU, a merge candidate list comprising one or more merge candidates;
partially constructing a sub-PU merge candidate by identifying or generating a first set of data for the sub-PU merge candidate;
adding the partially constructed sub-PU merge candidate to the merge candidate list;
selecting a merge candidate from the merge candidate list; and
when the selected merge candidate is the sub-PU merge candidate, completing the sub-PU merge candidate by generating a second set of data based on the first set of data and decoding the block of pixels by using the completed sub-PU merge candidate.

15. The electronic apparatus of claim 14, wherein the video decoder circuit is further capable of receiving a merge index and using the received merge index to select the merge candidate from the merge candidate list.

16. The electronic apparatus of claim 14, wherein, when the selected merge candidate is not the sub-PU merge candidate, the second set of data is not generated.

17. The electronic apparatus of claim 14, wherein:
the first set of data comprises motion information for a first subset of sub-PUs in the PU, and
the second set of data comprises motion information for a second subset of sub-PUs in the PU.

18. The electronic apparatus of claim 14, wherein the video decoder circuit is further capable of:
identifying a redundant merge candidate by comparing the first set of data for the partially constructed sub-PU merge candidate with a corresponding set of data for a different merge candidate in the merge candidate list; and
removing the identified redundant merge candidate from the merge candidate list.

19. The electronic apparatus of claim 18, wherein the sub-PU merge candidate is a first sub-PU merge candidate and the other merge candidate is a second sub-PU merge candidate, and wherein, in identifying the redundant merge candidate, the video decoder circuit compares an initial motion vector of the first sub-PU merge candidate with an initial motion vector of the second sub-PU merge candidate.

20. An electronic apparatus comprising:
a video decoder circuit capable of:
receiving a block of pixels that comprises a prediction unit (PU);
generating, for the PU, a merge candidate list comprising one or more merge candidates that includes a sub-PU merge candidate that is incomplete;
selecting a merge candidate from the merge candidate list; and
when the selected merge candidate is the sub-PU merge candidate, completing the sub-PU merge candidate and decoding the block of pixels by using the completed sub-PU merge candidate.

* * * * *